(12) United States Patent
Dias et al.

(10) Patent No.: US 10,876,063 B2
(45) Date of Patent: Dec. 29, 2020

(54) SYNDIOTACTIC PROPYLENE POLYMERS AND LUBRICATING OILS COMPRISING THE SAME

(71) Applicant: ExxonMobil Chemical Patents Inc., Baytown, TX (US)

(72) Inventors: Anthony J. Dias, Houston, TX (US); Jo Ann M. Canich, Houston, TX (US); George Rodriguez, Houston, TX (US); Liehpao O. Farng, Lawrenceville, NJ (US); Jean-Roch H. Schauder, Wavre (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/316,133

(22) PCT Filed: Jun. 18, 2015

(86) PCT No.: PCT/US2015/036474
§ 371 (c)(1),
(2) Date: Dec. 2, 2016

(87) PCT Pub. No.: WO2016/018523
PCT Pub. Date: Feb. 4, 2016

(65) Prior Publication Data
US 2017/0130159 A1    May 11, 2017

Related U.S. Application Data

(60) Provisional application No. 62/031,469, filed on Jul. 31, 2014.

(51) Int. Cl.
| | |
|---|---|
| *C10M 143/08* | (2006.01) |
| *C08F 210/06* | (2006.01) |
| *C08F 4/6592* | (2006.01) |
| *C10M 143/00* | (2006.01) |
| *C08F 210/14* | (2006.01) |
| *C10N 20/02* | (2006.01) |
| *C10N 30/02* | (2006.01) |
| *C10N 30/00* | (2006.01) |
| *C10N 40/25* | (2006.01) |

(52) U.S. Cl.
CPC ....... *C10M 143/08* (2013.01); *C08F 4/65925* (2013.01); *C08F 4/65927* (2013.01); *C08F 210/06* (2013.01); *C08F 210/14* (2013.01); *C10M 143/00* (2013.01); *C10M 2203/1006* (2013.01); *C10M 2203/1025* (2013.01); *C10M 2205/024* (2013.01); *C10M 2205/10* (2013.01); *C10M 2207/026* (2013.01); *C10M 2223/049* (2013.01); *C10N 2020/02* (2013.01); *C10N 2030/02* (2013.01); *C10N 2030/68* (2020.05); *C10N 2040/25* (2013.01)

(58) Field of Classification Search
CPC ............ C10N 2230/02; C10N 2020/02; C10N 2030/02; C10M 2205/022; C08F 4/65925; C08F 210/14; C08F 210/06; C08F 4/65927; C08F 2500/12
USPC .......................................................... 508/591
See application file for complete search history.

(56) References Cited

U.S. PATENT DOCUMENTS

| | | | |
|---|---|---|---|
| 5,391,617 A | 2/1995 | Olivier et al. | |
| 7,402,235 B2 | 7/2008 | Huang | |
| 7,662,895 B2* | 2/2010 | Brant | C08F 110/06 525/240 |
| 2004/0236042 A1* | 11/2004 | Datta | C08F 210/06 526/126 |
| 2009/0239999 A1* | 9/2009 | Canich | C08F 10/06 525/55 |
| 2011/0160502 A1 | 6/2011 | Wu et al. | |
| 2012/0015854 A1 | 1/2012 | Ravishankar et al. | |
| 2013/0165354 A1 | 6/2013 | Deckman | |
| 2013/0203640 A1 | 8/2013 | Matsunaga et al. | |

FOREIGN PATENT DOCUMENTS

| | | |
|---|---|---|
| CN | 100569842 | 12/2009 |
| CN | 103481393 | 1/2014 |
| EP | 0 422 498 | 4/1994 |
| EP | 0638611 | 2/1995 |
| JP | 2010-223891 A | 10/2010 |
| JP | 2013-249399 A | 12/2013 |
| JP | 2015-042003 A | 3/2015 |
| KR | 10-1993-0004273 Y | 7/1993 |
| WO | WO 0226485 | 4/2002 |
| WO | 2011/038331 A | 3/2011 |
| WO | 2016/018523 A | 2/2016 |

OTHER PUBLICATIONS

Rudnick, *Lubricant Additives Chemistry and Applications*; Marcel Dekker, Inc., 2003.
Baugh et al., *Stereoselective Polymerization with Single-Site Catalysts*, CRC Press, Taylor & Francis Group, LLC, 2008.
Kuhlman et al.; *Investigations of Chain Shuttling Olefin Polymerization Using Deuterium Labeling*; Macromolecules, 2008, vol. 41, pp. 4090-4094.
Fetters et al.; *Prediction of Melt State Poly(α-olefin) Rheological Properties: The Unsuspected Role of the Average Molecular Weight per Backbone Bond*, Macromolecules 2002, vol. 35, pp. 10096-10101.
Lohse, D., "The influence of Chemical Structure on Polyolefin Melt Rheology and Miscibility", Journal of Macromolecular Science, Part C: Polymer Reviews, Issue 45, pp. 289-308, 2005.

(Continued)

*Primary Examiner* — Vishal V Vasisth

(57) ABSTRACT

This disclosure relates to syndiotactic polymers containing units derived from propylene and units derived from $C_4$ to $C_{20}$ alpha olefins. The polymers can be prepared is slurry or solution polymerization processes using a zirconium-containing metallocene catalyst system. The polymers have a melt flow rate as determined by ASTM D-1238 (230° C., 2.16 kg) of from about 0.1 to about 20 g/10 min. The syndiotactic polymers are useful as viscosity index improvers.

16 Claims, No Drawings

(56) References Cited

OTHER PUBLICATIONS

Ver Strate, G., et al., "Polymers as Lubricating-Oil Viscosity Modifiers", American Chemical Society, Chapter 15, pp. 256-271, 1991.
Nello Pasquini (Ed.), "Propylene Handbook 2nd Edition", Chapter Section 5.2 (p. 308), Figure 5.1.

* cited by examiner

SYNDIOTACTIC PROPYLENE POLYMERS AND LUBRICATING OILS COMPRISING THE SAME

CROSS-REFERENCE TO RELATED APPLICATIONS

This present application is a National Stage Application of International Application No. PCT/US2015/036474, which claims priority to and the benefit of U.S. Provisional Application Ser. No. 62/031,469, filed Jul. 31, 2014, the entireties of which are incorporated herein by reference.

FIELD OF THE INVENTION

The present disclosure relates to syndiotactic polymers containing propylene and α-olefins that can be useful as a viscosity index improver, methods of making such polymers, and lubricating oils comprising such polymers.

BACKGROUND OF THE INVENTION

Lubrication fluids are applied between moving surfaces to reduce friction, thereby improving efficiency and reducing wear. Lubrication fluids also often function to dissipate the heat generated by moving surfaces.

One type of lubrication fluid is petroleum-based lubrication oil used for internal combustion engines. Lubrication oils contain additives that help the lubrication oil to have a certain viscosity at a given temperature. In general, the viscosity of lubrication oils and fluids is inversely dependent upon temperature. When the temperature of a lubrication fluid is increased, the viscosity generally decreases, and when the temperature is decreased, the viscosity generally increases. For internal combustion engines it is desirable to have a lower viscosity at low temperatures to facilitate the engine starting during cold weather, and a higher viscosity at higher ambient temperatures when lubrication properties typically decline.

Additives for lubrication fluids and oils include rheology modifiers, such as viscosity index (VI) improvers. VI improving components, many of which are derived from ethylene-α-olefin polymers, modify the rheological behavior of a lubricant to increase viscosity and promote a more constant viscosity over the range of temperatures at which the lubricant is used. Higher ethylene content copolymers efficiently promote oil thickening and shear stability. However, higher ethylene content copolymers also tend to aggregate in oil formulations leading to extremely viscous formulations. Aggregation typically happens at ambient or subambient conditions of controlled and quiescent cooling. This deleterious property of otherwise advantageous higher ethylene content viscosity improvers is measured by low temperature solution rheology. Various remedies have been proposed for these higher ethylene content copolymer formulations to overcome or mitigate the propensity towards the formation of high viscosity at low temperature.

It is believed that the performance of VI improvers can be substantially improved, as measured by the thickening efficiency (TE) and the shear stability index (SSI), by appropriate and careful manipulation of the structure of the VI improver. Both the TE and SSI are related to the molecular weight of the polymer. For example, polymers having low molecular weight generally have both lower measured TE and lower SSI than polymers having a high molecular weight. However, the TE and SSI are also determined by the polymer structure and chemistry. It has been discovered that performance improves when the distribution of the monomers and the chain architecture are controlled and segregated into at least two compositionally different and/or crystallinity different polymers. These different polymers may be achieved by the use of a synthesis process that employs metallocene-based catalysts in the polymerization process.

Compositions of amorphous and semi-crystalline ethylene-based copolymers have been used for lubricant oil formulations. The combination of two such ethylene copolymers allows for improved thickening efficiency, shear stability index, low temperature viscosity performance and pour point, and "finishing" as pellets for easy dissolving. Traditionally, such copolymer compositions are made from mixing two polymers made from conventional vanadium based Ziegler-Natta catalyst in an extruder or solvent based process. See, e.g., U.S. Pat. Nos. 7,402,235 and 5,391,617, and European Patent No. 0 638,611.

Propylene-based copolymers have been used as a viscosity index improver, as described in U.S. Patent Application Publication No. 2013/165354 A. The propylene-based polymer comprises from 60 wt % to 98 wt % propylene derived units and from 2 wt % to 40 wt % units derived from one or more other alpha olefins, a weight average molecular weight (Mw) of from 100,000 to 500,000, a number average molecular weight (Mn) of from 100,000 to 400,000, a molecular weight distribution (MWD=Mw/Mn) of from 1 to 2; and a mole ratio of propylene to one or more other alpha olefins from 50:50 to 85:15.

Nevertheless, there is still a need to provide an alternative polymer that can be used as a viscosity index improver and a lubricating oil comprising such polymers that exhibit good viscometrics, high thickening efficiency, good high temperature high shear performance, and acceptable shear stability index.

SUMMARY OF THE INVENTION

This disclosure relates to syndiotactic propylene polymers, methods of making such polymers, and the use of such polymers as viscosity index improvers in lubricating oil formulations.

Described herein is a process for making a syndiotactic polymer containing propylene and at least one α-olefin having 4 to 20 carbon atoms (also called a "syndiotactic propylene-α-olefin polymer" herein), the process comprises contacting a feed stream comprising propylene and at least one C4 to C20 α-olefin monomer with a catalyst system comprising a zirconium-containing precatalyst compound and an activator in a reactor under conditions sufficient to produce the syndiotactic propylene-α-olefin polymer.

The syndiotactic propylene-α-olefin polymer has a melt flow rate, as determined by ASTM D-1238 (230° C., 2.16 kg), of from about 0.1 to about 20 g/10 min or, in some embodiments, or from about 1 to about 10 g/10 min, or from about 2 to about 10 g/10 min.

The syndiotactic propylene-α-olefin polymer can have a thickening efficiency of greater than about 1.5, or greater than about 2.

Also described herein are lubricating oil compositions comprising at least 50 wt % of a base oil based on the weight of the lubricating oil and a syndiotactic propylene-α-olefin polymer having a melt flow rate, determined by ASTM D-1238 (230° C.; 2.16 kg), of from about 0.1 to about 20 g/10 min. The base oil can be selected from Group II base oil, Group III base oil, Group IV base oil, Group V base oil, and combinations thereof.

The lubricating oil composition may comprise from about 0.1 wt % to about 10 wt % of the syndiotactic propylene-α-olefin polymer, based on the weight of the lubricating oil composition.

The lubricating oil composition may have a kinematic viscosity at 40° C., as measured by ASTM D445-3, of greater than about 60 cSt, and/or a kinematic viscosity at 100° C., as measured by ASTM D445-5, of greater than about 10 cSt; and/or a viscosity index of greater than about 120.

PREFERRED EMBODIMENTS OF THE INVENTION

All numerical values within the detailed description and the claims herein are modified by "about" or "approximately" the indicated value, and take into account experimental error and variations that would be expected by a person having ordinary skill in the art.

As used herein, the new numbering scheme for the Periodic Table of the Elements is used as set out in CHEMICAL AND ENGINEERING NEWS, 63(5), 27 (1985).

Unless otherwise stated all pressures in psi are psig and all molecular weights are g/mol.

For purposes of this disclosure and the claims thereto, when a polymer is referred to as comprising an olefin, the olefin present in the polymer is the polymerized form of the olefin, respectively. Likewise the use of the term polymer is meant to encompass homopolymers and copolymers, where copolymers include any polymer having two or more chemically distinct monomers.

For the purposes of this disclosure, the term "polypropylene" as used herein means polymers containing propylene as monomers, it can be homopolypropylene or copolymer of propylene and α-olefin comonomers.

The term "catalyst system" is defined to mean a catalyst precursor/activator pair, such as a metallocene/activator pair, optionally with co-activator. When "catalyst system" is used to describe such a pair before activation, it means the unactivated catalyst (precatalyst) together with an activator and, optionally, a co-activator (such as a trialkylaluminum compound). When it is used to describe such a pair after activation, it means the activated transition metal catalyst including the charge-balancing moiety if the activated catalyst carries a charge. Additionally, the catalyst system may optionally comprise a co-activator.

"Catalyst precursor" is also often referred to as precatalyst, catalyst, precursor, metallocene, transition metal compound, precatalyst compound, unactivated catalyst, or transition metal complex. These words are used interchangeably. Activator and cocatalyst are also used interchangeably. A scavenger is a compound that is typically added to facilitate polymerization by scavenging impurities. Some scavengers may also act as activators and may be referred to as co-activators. A co-activator which is not a scavenger may also be used in conjunction with an activator in order to form an active catalyst with a transition metal compound. In some embodiments, a co-activator can be pre-mixed with the transition metal compound to form an alkylated transition metal compound, also referred to as an alkylated catalyst compound or alkylated metallocene. Co-activators are often aluminum alkyls, also referred to as alkyl-aluminums, alkylaluminum compounds, alkylaluminums, or alkylaluminum compounds.

As used herein, non-coordinating anion (NCA) is defined to mean an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used or contained in the non-coordinating anion. Suitable metals include, but are not limited to, aluminum, gold, and platinum. Suitable metalloids include, but are not limited to, boron, aluminum, phosphorus, and silicon. A subclass of non-coordinating anions comprises stoichiometric activators, which can be either neutral or ionic. The terms ionic activator, stoichiometric ionic activator, discrete ionic activator, non-coordinating anion activator, and NCA activator can be used interchangeably. Likewise, the terms neutral stoichiometric activator and Lewis acid activator can be used interchangeably.

Described herein are syndiotactic propylene-α-olefin polymers and lubricating oil compositions comprising the same. Without being bound by theory, it is believed that, the syndiotactic propylene-α-olefin polymers described herein are particularly useful as viscosity index improvers due to their syndiotactic structure.

The degree and type of tacticity of a polyolefin polymer is known to affect the physical properties of the polymer. Tacticity can also be related to the degree of crystallinity that a polymer or copolymer is capable of obtaining. As used herein, the tacticity of a polymer, reflects the stereochemical regularity of hydrocarbyl groups which are pendent to the polymer molecule backbone (i.e., the tacticity of the polymer). Several types of tacticity are known, including atactic, normal isotactic, isotactic stereoblock, syndiotactic, and hemiisotactic.

The backbone rigidity of a syndiotactic polypropylene (sPP) is greater than that of atactic and isotactic polypropylenes (aPP, iPP) as gauged by its higher characteristic ratio C∞ (sPP: about 9 MPa; aPP or iPP: about 6 MPa). The higher backbone rigidity leads to higher plateau modulus for syndiotactic polypropylene relative to atactic polypropylene and isotactic polypropylene when they have similar molecular weights. Without being bound by theory, it is believed that this attribute affords syndiotactic polymers improved viscometric properties in lubricant applications when such syndiotactic polymers are used as viscosity modifiers. Therefore, without being bound by any theory, it is believed that, compared with non-syndiotactic propylene-α-olefin polymers, the syndiotactic propylene-α-olefin polymers provided herein have improved viscometric properties and can provide better thickening efficiency in lubricating applications when used as viscosity index improvers.

Syndiotactic Polymers

Syndiotactic polymers are those where the hydrocarbyl groups pendent to the polymer molecular backbone alternate sequentially in order from one side or plane to the opposite side or plane relative to the polymer backbone, as shown below:

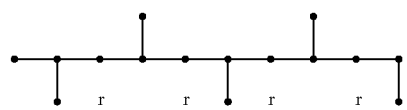

In NMR nomenclature, the pentad shown above is described as . . . rrrr . . . in which each r represents a "racemic" dyad, i.e., successive methyl groups on alternate sides of the plane (see J. A. Ewen's chapter in "Catalytic Polymerization of Olefins", Proceedings of the International Symposium on Future Aspects of Olefin Polymerization, Tokyo, Japan, 4-6 Jul. 1995", Keii & Soga, Eds., Elsevier Science Publishers B.V., Amsterdam, 1986, p. 271 (the Ewen method). The percentage of r dyads in the chain determines the degree of syndiotacticity of the polymer, and is related to the crystallinity of the polymer.

The molecular chain backbone of a syndiotactic polymer can be considered to be a copolymer of olefins with alternating stereochemical configurations. Highly syndiotactic polymers may be highly crystalline and thus may have defined melting points similar to their isotactic polymorphs and thus may be characterized in part by their melting point temperature.

Tacticity (% [r] dyads, % [m] dyads, and the like) is determined using 13C NMR according to the method described at pages 271 to 292 of "Catalytic Polymerization of Olefins, Proceedings of the International Symposium on Future Aspects of Olefin Polymerization, Tokyo, Japan, 4-6 Jul. 1995", Keii & Soga, Eds., Elsevier Science Publishers B.V., Amsterdam, 1986.

Polymerization

Described herein are processes for making syndiotactic propylene-α-olefin polymers. The process employs transition metal (in particular zirconium) catalysts together with one or more activators (such as a non-coordinating anion), preferably in the presence of a chain transfer agent (such as an alkylaluminum compound and/or hydrogen). Some transition metal catalysts contain Cs-symmetric active sites, which favors the formation of propylene-α-olefin polymers with syndiotactic stereo arrangement of the monomer.

The process for producing the syndiotactic propylene-α-olefin polymer includes contacting propylene and at least one $C_4$ to $C_{20}$ α-olefin with a zirconium-containing metallocene catalyst and an activator, preferably a non-coordinating anion activator. The catalyst may have a structure such as that represented by any of formulae (1), (1a), (1b), (2), (3), or (3a), described below, having $C_s$ or pseudo-$C_s$ symmetry, or a structure as represented by formula (4), described below, having $C_2$ symmetry. The polymerization may occur in the presence of a chain transfer agent, such as an alkylaluminum compound.

The polymerization may take place at a reaction temperature of from −20° C. to 160° C., or from 0 to 120° C., or from 10 to 100° C., where desirable ranges may include ranges from any lower limit to any upper limit. The polymerization may take place at reaction pressure of from 10 psig to 1000 psig, or from 50 to 800 psig, or from 100 psig to 500 psig, where desirable ranges may include ranges from any lower limit to any upper limit.

In some embodiments, the hydrogen may be present in the reactor at 1000 ppm or less, or 750 ppm or less, or 500 ppm or less, or 250 ppm or less, or 100 ppm or less, or 50 ppm or less, or 25 ppm or less, or 10 ppm or less, or 5 ppm or less. Alternatively, in any process described herein hydrogen, if present, is present in the feed at 1000 ppm or less, or 750 ppm or less, or 500 ppm or less, or 250 ppm or less, or 100 ppm or less, or 50 ppm or less, or 25 ppm or less, or 10 ppm or less, or 5 ppm or less by weight of the feed.

Many polymerization processes and reactor types used for metallocene-catalyzed polymerizations such as solution, slurry, and bulk polymerization processes can be used in this disclosure. In some embodiments, if a solid or supported catalyst is used, a slurry or continuous fixed bed or plug flow process is suitable. In some embodiments, the monomers are contacted with the metallocene compound and the activator in the solution phase, bulk phase, or slurry phase, preferably in a continuous stirred tank reactor, continuous tubular reactor, or a batch reactor. The monomer(s), metallocene, and activator are contacted for a residence time of 1 second to 100 hours, or 30 seconds to 50 hours, or 2 minutes to 6 hours, or 1 minute to 4 hours, where desirable ranges may include ranges from any lower limit to any upper limit. In another embodiment, solvent or diluent is present in the reactor and is selected from the group consisting of butanes, pentanes, hexanes, heptanes, octanes, nonanes, decanes, undecanes, dodecanes, tridecanes, tetradecanes, pentadecanes, hexadecanes, toluene, o-xylene, m-xylene, p-xylene, ethylbenzene, isopropylbenzene, and n-butylbenzene; preferably toluene and or xylenes and or ethylbenzene, normal paraffins (such as Norpar solvents available for ExxonMobil Chemical Company, Houston, Tex.), or isoparaffin solvents (such as Isopar solvents available for ExxonMobil Chemical Company, Houston, Tex.). These solvents or diluents are usually pre-treated in same manners as the feed olefins.

One or more reactors in series or in parallel may be used in the polymerization process. The transition metal compound, activator, and chain transfer agent, if used, may be delivered as a solution or slurry in a solvent or in the α-olefin feed stream, either separately to the reactor, activated in-line just prior to the reactor, or preactivated and pumped as an activated solution or slurry to the reactor. Polymerizations can be carried out in either single reactor operation, in which propylene and comonomers(s), catalyst/activator, and chain transfer agent are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the precatalyst is activated in the reactor in the presence of olefin. In some embodiments, the precatalyst such as the dichloride form of the metallocenes is pre-treated with alkylaluminum reagents, especially, tri-isobutylaluminum, tri-n-hexylaluminum and/or tri-n-octylaluminum, followed by charging into the reactor containing other catalyst component and the feed olefins, or followed by pre-activation with the other catalyst component to give the fully activated catalyst, which is then fed into the reactor containing feed olefins. In another alternative, the pre-catalyst metallocene is mixed with the activator and/or the co-activator and this activated catalyst is then charged into reactor, together with feed olefin stream containing some scavenger or co-activator. In another alternative, the whole or part of the co-activator is pre-mixed with the feed olefins and charged into the reactor at the same time as the other catalyst solution containing metallocene and activators and/or co-activator.

Generally, when using metallocene catalysts, after pre-treatment of feed olefins, solvents, diluents and after precautions to keep the catalyst component stream(s) and reactor free of impurities, the reaction should proceed well. In some embodiments, when using metallocene catalysts, particularly when they are immobilized on a support, the complete catalyst system will additionally comprise one or more scavenging compounds. Here, the term scavenging compound means a compound that removes polar impurities from the reaction environment. These impurities adversely affect catalyst activity and stability. Typically, purifying steps are usually used before introducing reaction components to a reaction vessel. But such steps will rarely allow polymerization without using some scavenging compounds.

Normally, the polymerization process will still use at least small amounts of scavenging compounds.

The syndiotactic propylene-α-olefin polymers described herein can also be produced in homogeneous solution processes. Generally this involves polymerization in a continuous reactor in which the polymer formed and the starting monomer and catalyst materials supplied, are agitated to reduce or avoid concentration or temperature gradients. Temperature control in the reactor is generally obtained by balancing the heat of polymerization and with reactor cooling by reactor jackets or cooling coils or a cooled sidestream of reactant to cool the contents of the reactor, auto refrigeration, pre-chilled feeds, vaporization of liquid medium (diluent, monomers or solvent) or combinations of the above. Adiabatic reactors with pre-chilled feeds may also be used. The reactor temperature depends on the catalyst used and the product desired. Higher temperatures tend to give lower molecular weights and lower temperatures tend to give higher molecular weights, however this is not a hard and fast rule. In order to produce fluids with narrow molecular distribution, such as to promote the highest possible shear stability, it is useful to control the reaction temperature to obtain minimum of temperature fluctuation in the reactor or over the course of the reaction time. If multiple reactors are used in series or in parallel, it is useful to keep the temperature constant in a pre-determined value to minimize any broadening of molecular weight distribution. In order to produce fluids with broad molecular weight distribution, one can adjust the reaction temperature swing or fluctuation, or as in series operation, the second reactor temperature is preferably higher than the first reactor temperature. In parallel reactor operation, the temperatures of the two reactors are independent. One can also use two types of metallocene catalyst.

The reaction time or reactor residence time is usually dependent on the type of catalyst used, the amount of catalyst used, and the desired conversion level. Different metallocenes have different activities. Usually, a higher degree of alkyl substitution on the cyclopentadienyl ring, or bridging, improves catalyst productivity. Catalysts such as diphenylmethylidene(cyclopentadienyl)(9-fluorenyl)zirconium dimethyl, isopropylidene-(cyclopentadienyl)(9-fluorenyl)zirconium dimethyl, diphenylsilylene(cyclopentadienyl)(9-fluorenyl)zirconium dimethyl, dimethylsilylene (cyclopentadienyl)(9-fluorenyl)zirconium dimethyl, ethylene(cyclopentadienyl)(9-fluorenyl)zirconium dimethyl, and di(para-triethylsilylphenyl)methylene(2,7-di-tert-butyl fluorenyl)(cyclopentadienyl) zirconium dimethyl, and mixtures thereof are particularly useful herein.

The amount of catalyst components used may be determinative for reaction efficiency. High amount of catalyst loading may give high conversion at short reaction time. However, high amount of catalyst usage makes the production process uneconomical and it may be difficult to manage the reaction heat or to control the reaction temperature. Therefore, it is useful to choose a catalyst with maximum catalyst productivity to minimize the amount of precatalyst and the amount of activator needed. When the catalyst system is a metallocene plus a Lewis acid or an ionic activator with a NCA component, the metallocene used is typically in the range of 0.01 microgram to 500 micrograms of metallocene component/gram of α-olefin feed. Usually the preferred range is from 0.1 microgram to 100 microgram of metallocene component per gram of α-olefin feed.

In some embodiments, the mole ratio of metallocene catalyst to non-coordinating anion activator can be from 10 to 0.1, or from 5 to 0.5, or from 3 to 0.5, or from 5 to 0.2, or from 2 to 0.5, or from 1.5 to 0.7, or from 1.2 to 0.8 or from 1.1 to 0.9, where desirable ranges may include ranges from any lower limit to any upper limit. In some embodiments, the metallocene concentration is selected to be less than 1 milligram per gram of olefin feed, or less than 0.1 milligram, or less than 50 microgram, or less than 30 microgram, or less than 20 microgram, or less than 10 microgram, or less than 5 microgram, or less than 2 microgram per gram of olefin feed.

Typically, one prefers to have the highest possible conversion (close to 100%) of feed α-olefin in shortest possible reaction time. However, in continuous solution polymerization operation, sometimes it is beneficial to run the reaction at an optimum conversion, which is slightly less than 100% conversion. There are also occasions, when partial conversion is more desirable when the narrowest possible MWD of the product is desirable because partial conversion can avoid a MWD broadening effect. If the reaction is conducted to less than 100% conversion of the α-olefin, the unreacted starting material after separation from other product and solvents/diluents can be recycled to increase the total process efficiency.

When a solid supported catalyst is used, a slurry polymerization process generally operates in the similar temperature, pressure and residence time range as described previously. In a slurry polymerization, a suspension of solid catalyst, promoters, monomer and comonomers are added. The suspension including diluent is intermittently or continuously removed from the reactor. The fluid is then distilled to remove solvent, any unreacted components and light product. A portion or all of the solvent and unreacted component or light components can be recycled for reuse.

If the catalyst used is a solution catalyst (i.e. not supported), when the reaction is complete (such as in a batch mode), or when the product is withdrawn from the reactor (such as in a continuous solution polymerization process), the product may still contain soluble, suspended or mixed catalyst components. These components are preferably deactivated or removed. Any of the usual catalyst deactivation methods or aqueous wash methods can be used to remove the catalyst component. Typically, the reaction is deactivated by addition of stoichiometric amount or excess amount of air, moisture, alcohol, isopropanol, etc. The mixture is then washed with dilute sodium hydroxide or with water to remove catalyst components. The residual organic layer is then subjected to distillation to remove solvent, which can be recycled for reuse. The distillation can further remove any light reaction product from $C_{18}$ and less. These light components can be used as diluent for further reaction, as olefinic raw material for other chemical synthesis, or can be hydrogenated to be used as high quality paraffinic solvents.

Catalyst Compounds

As used herein, the terms "hydrocarbyl radical," "hydrocarbyl," and "hydrocarbyl group" are used interchangeably throughout this document. Likewise the terms "group," "radical," and "substituent" are also used interchangeably throughout this document. For purposes of this disclosure, "hydrocarbyl radical" is defined to be a $C_1$-$C_{100}$ radical and may be linear, branched, or cyclic. When cyclic, the hydrocarbon radical may be aromatic or non-aromatic. "Hydrocarbon radical" is defined to include substituted hydrocarbyl radicals, halocarbyl radicals, substituted halocarbyl radicals, silylcarbyl radicals, and germylcarbyl radicals as these terms are defined below. Substituted hydrocarbyl radicals are radicals in which at least one hydrogen atom has been substituted with at least one functional group such as $NR*_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. CF$_3$).

Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include SiH$_3$, SiH$_2$R*, SiHR*$_2$, SiR*$_3$, SiH$_2$(OR*), SiH(OR*)$_2$, Si(OR*)$_3$, SiH$_2$(NR*$_2$), SiH(NR*$_2$)$_2$, Si(NR*$_2$)$_3$, and the like where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include GeH$_3$, GeH$_2$R*, GeHR*$_2$, GeR*$^5$$_3$, GeH$_2$(OR*), GeH(OR*)$_2$, Ge(OR*)$_3$, GeH$_2$(NR*$_2$), GeH(NR*$_2$)$_2$, Ge(NR*$_2$)$_3$, and the like where R* is independently a hydrocarbyl or halocarbyl radical and two or more R* may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of groups 1-17 of the periodic table (except carbon and hydrogen) either alone or connected to other elements by covalent bonds or other interactions such as ionic bonds, van der Waals forces, or hydrogen bonding. Examples of functional heteroatom containing groups include carboxylic acids, acid halides, carboxylic esters, carboxylic salts, carboxylic anhydrides, aldehydes and their chalcogen (group 14) analogues, alcohols and phenols, ethers, peroxides and hydroperoxides, carboxylic amides, hydrazides and imides, amidines and other nitrogen analogues of amides, nitriles, amines and imines, azos, nitros, other nitrogen compounds, sulfur acids, selenium acids, thiols, sulfides, sulfoxides, sulfones, phosphines, phosphates, other phosphorus compounds, silanes, boranes, borates, alanes, aluminates. Functional groups may also be taken broadly to include organic polymer supports or inorganic support material such as alumina, and silica. Preferred examples of polar groups include NR*$_2$, OR*, SeR*, TeR*, PR*$_2$, AsR*$_2$, SbR*$_2$, SR*, BR*$_2$, SnR*$_3$, PbR*$_3$ and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure.

In using the terms "substituted or unsubstituted cyclopentadienyl ligand", "substituted or unsubstituted indenyl ligand", and "substituted or unsubstituted tetrahydroindenyl ligand", the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands or heterotetrahydoindenyl ligands, each of which can additionally be substituted or unsubstituted.

The hydrocarbyl radical may be independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Examples of cyclopentadienyl and indenyl ligands are illustrated below as anionic ligands. The ring numbering scheme is also illustrated. When a cyclopentadienyl ligand has one bridging substituent, the bridging substituent is in the one position. When a cyclopentadienyl ligand has two bridging substituents, the bridging substituents are in the one and two positions. When a fluorenyl ligand has a bridging substituent, the bridging substituent is in the nine position. When dibenzo[b,h]fluorene has a bridging substituent, the bridging substituent is in the twelve position.

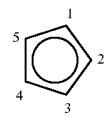

Cyclopentadienyl

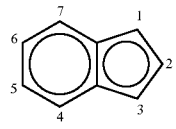

Indenyl

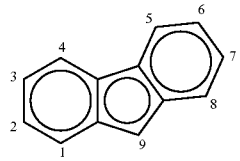

Fluorenyl

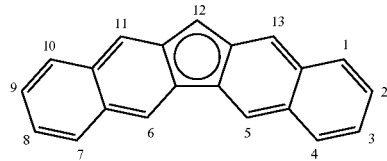

debenzo[b, h]fluorene

A similar numbering and nomenclature scheme is used for heterocyclopentapentalenyls, heterofluorenyls, and the like, as illustrated below. Each structure illustrated is drawn as an anion.

Non-limiting examples of heterocyclopentapentalenyls include the following, where Q represents the heteroatoms O, S, Se, or Te, or heteroatom groups, NR, PR, AsR, or SbR where R** is hydrogen, or a hydrocarbyl, substituted hydrocarbyl, halocarbyl, substituted halocarbyl, silylcarbyl, or germylcarbyl substituent. When a heterocyclopentapentalenyl ligand has a bridging substituent, the bridging substituent is in the seven position.

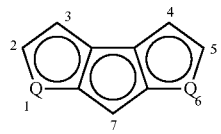

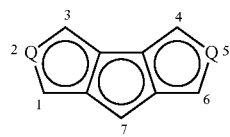

Non-limiting examples of heterofluorenyls where Z represents the heteroatoms N or P include the following. When a heterofluorenyl ligand has a bridging substituent, the bridging substituent is in the five position.

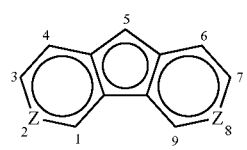

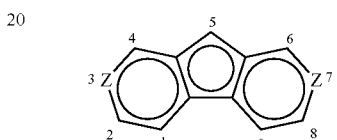

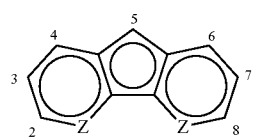

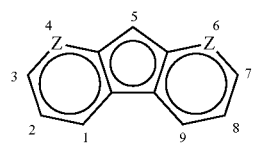

A "ring heteroatom" is a heteroatom that is within a cyclic ring structure. A "heteroatom substituent" is heteroatom containing group that is directly bonded to a ring structure through the heteroatom. A "bridging heteroatom substituent" is a heteroatom or heteroatom group that is directly bonded to two different ring structures through the heteroatom. The terms "ring heteroatom", "heteroatom substituent", and "bridging heteroatom substituent" are illustrated below where Z and R' are as defined above. It should be noted that a "heteroatom substituent" can be a "bridging heteroatom substituent" when R' is additionally defined as the ligand "A".

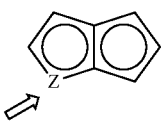 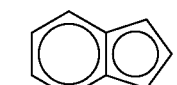

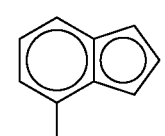

"heteroatom substituent"

A "ring carbon atom" is a carbon atom that is part of a cyclic ring structure. By this definition, an indenyl ligand has nine ring carbon atoms; a cyclopentadienyl ligand has five ring carbon atoms.

Transition metal compounds have symmetry elements and belong to symmetry groups. These elements and groups are well established and can be referenced from Chemical Applications of Group Theory (2nd Edition) by F. Albert Cotton, Wiley-Interscience, 1971. Compounds with $C_s$ symmetry possess a mirror plane. For example, the structure below has a $C_s$ symmetric plane that bisects the zirconium center, the carbon bridge and the cyclopentadienyl and fluorenyl ligands.

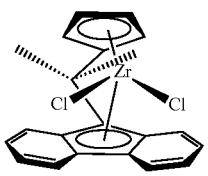

Symmetric substituents are substituents that retain the $C_s$ symmetry of the transition. For example, t-butyl groups substituted in the 2 and 7 positions of a fluorenyl ligand would be symmetric substituents.

Compounds with pseudo-$C_s$ symmetry are similar with the exception that the bridging group, the labile ligands, and distant substituents of similar size on the cyclopentadienyl ligand or fluorenyl ligand are not included in determining the symmetry of the compound. These compounds, while not truly $C_s$-symmetric, are considered to have $C_s$-symmetric active sites for olefin polymerization. Therefore, a compound, for example having a MeEtSi or MePhSi bridging ligand, is considered to have a pseudo $C_s$-plane of symmetry given the appropriate remaining ligand structure. Likewise, a compound, for example having one Me and one Cl labile ligand, is considered to have a pseudo $C_s$-plane of symmetry given the appropriate remaining ligand structure. Non-limiting examples of pseudo $C_s$ symmetric compounds are illustrated below:

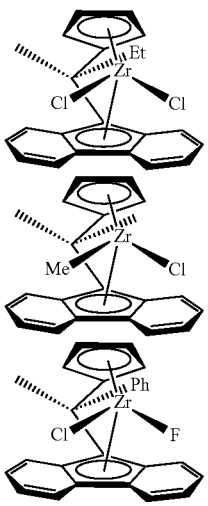

Compounds with pseudo-$C_s$ symmetry can also have unlike substituents on the non-labile ligands (i.e., cyclopentadienyl or fluorenyl ligands) if the substituents are distant from the active site. Substituents of this type, referred to as pseudo symmetric substituents, are typically adjacent to the bridging group and do not substantially differ in size from one another. Typically the size difference of these substituents is within 2 non-hydrogen atoms of each other. Thus, a cyclopentadienyl substituted at the 2 and the 5 positions with methyl and ethyl, respectively, or a cyclopentadienyl substituted at the 2 position with methyl and not substituted in the 5 position, or a fluorenyl substituted at the 1 and the 8 positions with hexyl and octyl, respectively, would be considered to have pseudo-$C_s$ symmetry.

In general, those catalysts both capable of producing syndiotactic polypropylene and capable of reacting with hydrogen to terminate the growing polymer chain, are catalysts that are useful for producing the syndiotactic propylene-α-olefin copolymers herein.

Catalysts useful for making the syndiotactic propylene-α-olefin copolymers include metallocene compounds (pre-catalysts) having the structure represented by formula (1) having $C_s$ or pseudo-$C_s$ symmetry:

(1)

wherein:

M is zirconium;

$L^1$ is a unsubstituted fluorenyl, heterocyclopentapentalenyl, or heterofluorenyl, or a substituted fluorenyl, heterocyclopentapentalenyl, or heterofluorenyl ligand with one or more symmetric or pseudo symmetric substituents, each substituent group being, independently, a radical group which is a hydrocarbyl, substituted hydrocarbyl, halocarbyl, substituted halocarbyl, silylcarbyl or germylcarbyl, and optionally two or more adjacent substituents may join to form a substituted or unsubstituted, saturated, partially unsaturated or aromatic, cyclic or polycyclic substituent;

$L^2$ is a cyclopentadienyl ring or a substituted cyclopentadienyl ring with one or more symmetric or pseudo symmetric substituents in the 2 and 5 positions of the ring, each substituent group being, independently, a radical group which is a hydrocarbyl, substituted hydrocarbyl, halocarbyl, substituted halocarbyl, silylcarbyl or germylcarbyl;

G is a bridging group;

X are independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a anionic chelating ligand.

In preferred embodiments of formula (1), $L^1$ is fluorenyl or substituted fluorenyl; preferably fluorenyl, 2,7-dimethylfluorenyl, 2,7-diethylfluorenyl, 2,7-dipropylfluorenyl, 2,7-dibutylfluorenyl, 2,7-diphenylfluorenyl, 2,7-dichlorofluorenyl, 2,7-dibromofluorenyl, 3,6-dimethylfluorenyl, 3,6-diethylfluorenyl, 3,6-dipropylfluorenyl, 3,6-dibutylfluorenyl, 3,6-diphenylfluorenyl, 3,6-dichlorofluorenyl, 3,6-dibromofluorenyl, 2-7-di-tertbutyl fluorenyl, or 1,1,4,4,7,7,10,10-octamethyl-octahydrodibenzofluorenyl; more preferably fluorenyl, 2,7-dimethylfluorenyl, 2,7-diethylfluorenyl, 2,7-dipropylfluorenyl, 2,7-dibutylfluorenyl, 3,6-dimethylfluorenyl, 3,6-diethylfluorenyl, 3,6-dipropylfluorenyl, 3,6-dibutylfluorenyl, 2-7-di-tertbutylfluorenyl, or 1,1,4,4,7,7,10, 10-octamethyl-octahydrodibenzofluorenyl; most preferably 2,7-di-tert-butylfluorenyl or fluorenyl; $L^2$ is preferably cyclopentadienyl; G is preferably methylene, dimethylmethylene, diphenylmethylene, dimethylsilylene, diphenylsilylene, di(4-triethylsilylphenyl)silylene, ethylene, or di(para-triethylsilylphenyl)methylene; more preferably diphenylmethylene, diphenylsilylene, dimethylsilylene, ethylene, or di(para-triethylsilylphenyl)methylene; and most preferably diphenylmethylene or di(para-triethylsilylphenyl)methylene; X is preferably hydrocarbyl or halo, more preferably methyl, benzyl, fluoro or chloro, most preferably methyl or chloro; M is zirconium.

A subset of the metallocene compounds (pre-catalysts) represented by formula (1) having $C_s$ or pseudo-$C_s$ symmetry that may be used are represented by formula (1a):

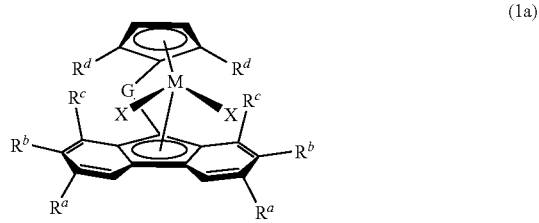

(1a)

wherein M, G and X are defined as in formula (1);

each $R^a$ and $R^b$ are selected from hydrogen, halogen, hydrocarbyl, substituted hydrocarbyl, halocarbyl, substituted halocarbyl, silylcarbyl, germylcarbyl or polar radicals, and optionally two or more adjacent substituents may join to form a substituted or unsubstituted, saturated, partially unsaturated or aromatic, cyclic or polycyclic substituent, with the proviso that each $R^a$ is the same and each $R^b$ is the same and allow the compound to be $C_s$-symmetric or pseudo $C_s$-symmetric;

each $R^c$ is a symmetric or pseudo symmetric substituent with respect to the other and is selected from hydrogen or a hydrocarbyl, substituted hydrocarbyl, halocarbyl, substituted halocarbyl, silylcarbyl or germylcarbyl radicals;

each $R^d$ is a symmetric or pseudo symmetric substituent with respect to the other and is selected from hydrogen or a hydrocarbyl, substituted hydrocarbyl, halocarbyl, substituted halocarbyl, silylcarbyl or germylcarbyl radicals.

In some embodiments of formula (1a), each $R^d$, $R^a$ and $R^c$ are preferably hydrogen, and each $R^b$ is preferably a hydrogen, hydrocarbyl, halogen, silylcarbyl, or polar radical; more preferably, hydrogen, methyl, ethyl, propyl, butyl, phenyl, mesityl, fluoro, chloro, bromo, dimethylamido, diethylamido or methoxy; even more preferably hydrogen or butyl; still more preferably hydrogen or tert-butyl; and most preferably hydrogen.

In other embodiments of formula (1a), each $R^d$, $R^b$ and $R^c$ are preferably hydrogen, and each $R^a$ is preferably a hydrogen, hydrocarbyl, halogen, or silylcarbyl; more preferably, hydrogen, methyl, ethyl, propyl, butyl, fluoro, chloro, or bromo; even more preferably hydrogen or butyl; still more preferably hydrogen or tert-butyl; and most preferably hydrogen.

Still, in other embodiments of formula (1a), each $R^d$ and $R^c$ are preferably hydrogen, and each $R^a$ and $R^b$ are joined together to form a fused partially saturated six-membered carbon ring, each such fused ring preferably substituted with four methyl substituents. Such preferred ligand structure is illustrated in formula (1b):

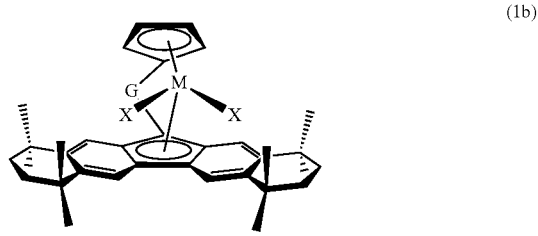

(1b)

Still in other embodiments of formula (1a) $R^c$ and $R^d$ are preferably hydrogen; each $R^a$ and $R^b$ are chosen from hydrogen, bromine, chlorine, methyl, ethyl, propyl, butyl or phenyl, more preferably $R^a$ is hydrogen and $R^b$ is chosen from hydrogen, methyl, ethyl, propyl, or butyl, or $R^b$ is hydrogen and $R^a$ is chosen from hydrogen, methyl, ethyl, propyl, or butyl, even more preferably $R^a$ is hydrogen and $R^b$ is tert-butyl or hydrogen; G is preferably methylene, dimethylmethylene, diphenylmethylene, dimethylsilylene, diphenylsilylene, di(4-triethylsilylphenyl)silylene, ethylene, more preferably diphenylmethylene, diphenylsilylene, and dimethylsilylene; and most preferably diphenylmethylene; X is preferably hydrocarbyl or halo, more preferably methyl, benzyl, floro or chloro, most preferably methyl or chloro; M is preferably zirconium.

Preferred but non-limiting examples of pre-catalysts represented by formula (1) include: diphenylmethylene(cyclopentadienyl)(9-fluorenyl)zirconium dichloride, methylene-(cyclopentadienyl)(9-fluorenyl)zirconium dichloride, dimethylmethylene(cyclopentadienyl) (9-fluorenyl)zirconium dichloride, dimethylsilylene(cyclopentadienyl)(9-fluorenyl)zirconium dichloride, diphenylsilylene(cyclopentadienyl)(9-fluorenyl)zirconium dichloride, ethylene-(cyclopentadienyl)(9-fluorenyl)zirconium dichloride, diphenylmethylene(cyclopentadienyl) (9-fluorenyl)zirconium dimethyl, methylene(cyclopentadienyl)(9-fluorenyl) zirconium dimethyl, dimethylmethylene(cyclopentadienyl) (9-fluorenyl)zirconium dimethyl, dimethyl-silylene (cyclopentadienyl)(9-fluorenyl)zirconium dimethyl, diphenylsilylene-(cyclopentadienyl)(9-fluorenyl)zirconium dimethyl, ethylene(cyclopentadienyl)(9-fluorenyl)zirconium dimethyl, and di(para-triethylsilylphenyl)methylene(2, 7-di-tertbutyl fluorenyl)(cyclopentadienyl) zirconium dimethyl. The most preferred pre-catalysts represented by formula (1) are diphenylmethylene(cyclopentadienyl)(9-fluorenyl)zirconium dimethyl, diphenyl-methylene(cyclopentadienyl)(9-fluorenyl)zirconium dimethyl, and di(para-triethylsilylphenyl)methylene(2,7-di-tertbutyl fluorenyl) (cyclopentadienyl) zirconium dimethyl.

Catalysts capable of making the syndiotactic propylene-α-olefin polymers can also include metallocene compounds (pre-catalysts) having the structure represented by formula (2) having $C_s$ or pseudo-$C_s$ symmetry:

(2)

wherein:

M is zirconium;

L¹ is a unsubstituted fluorenyl, heterocyclopentapentalenyl, or heterofluorenyl, or a substituted fluorenyl, heterocyclopentapentalenyl, or heterofluorenyl ligand with one or more symmetric or pseudo symmetric substituents, each substituent group being, independently, a radical group which is a hydrocarbyl, substituted hydrocarbyl, halocarbyl, substituted halocarbyl, silylcarbyl or germylcarbyl, and optionally two or more adjacent substituents may join to form a substituted or unsubstituted, saturated, partially unsaturated or aromatic, cyclic or polycyclic substituent;

G is a bridging group;

J is a heteroatom from group 15, preferably N or P, most preferably N;

R' is a radical group which is a hydrocarbyl, substituted hydrocarbyl, halocarbyl, or substituted halocarbyl;

L' is a neutral Lewis base and w represents the number of L' bonded to M where w is 0, 1, or 2, and optionally any L' and any X may be bonded to one another.

X are independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a anionic chelating ligand.

In formula (2), L¹ is fluorenyl or substituted fluorenyl, or preferably fluorenyl, 2,7-dimethylfluorenyl, 2,7-diethylfluorenyl, 2,7-dipropylfluorenyl, 2,7-dibutylfluorenyl, 2,7-diphenylfluorenyl, 2,7-dichlorofluorenyl, 2,7-dibromofluorenyl, 3,6-dimethylfluorenyl, 3,6-diethylfluorenyl, 3,6-dipropylfluorenyl, 3,6-dibutylfluorenyl, 3,6-diphenylfluorenyl, 3,6-dichlorofluorenyl, 3,6-dibromofluorenyl or 1,1,4,4,7,7,10,10-octamethyl-octahydrodibenzofluorenyl, or preferably fluorenyl, 2,7-dimethylfluorenyl, 2,7-diethylfluorenyl, 2,7-dipropylfluorenyl, 2,7-dibutylfluorenyl, 3,6-dimethylfluorenyl, 3,6-diethylfluorenyl, 3,6-dipropylfluorenyl, 3,6-dibutylfluorenyl, or 1,1,4,4,7,7,10,10-octamethyl-octahydrodibenzofluorenyl, or preferably 2,7-di-tert-butylfluorenyl, 3,6-di-tert-butylfluorenyl, 1,1,4,4,7,7,10,10-octamethyl-octahydrodibenzofluorenyl, or fluorenyl. G is methylene, dimethylmethylene, diphenylmethylene, dimethylsilylene, methylphenylsilylene, diphenylsilylene, di(4-triethylsilylphenyl)silylene, ethylene, or preferably diphenylmethylene, diphenylsilylene, methylphenylsilylene, and dimethylsilylene; or preferably dimethylsilylene. J is preferably nitrogen. R' is hydrocarbyl or halocarbyl, or preferably $C_3$-$C_{20}$ hydrocarbyl, or preferably all isomers (including cyclics and polycyclics) of propyl, butyl, pentyl, hexyl, heptyl, octyl, nonyl, decyl, undecyl, dodecyl, benzyl, phenyl and substituted phenyl, or preferably tert-butyl, neopentyl, benzyl, phenyl, diisopropylphenyl, adamantyl, norbornyl, cyclohexyl, cyclooctyl, cyclodecyl, and cyclododecyl, or preferably, tert-butyl, adamant-1-yl, norborn-2-yl, cyclohexyl, cyclooctyl, and cyclododecyl. X is hydrocarbyl or halo, more preferably methyl, benzyl, floro or chloro, or preferably methyl or chloro; w is preferably zero (L' being absent); M is zirconium.

Catalysts useful for making the syndiotactic propylene-α-olefin copolymers can also include metallocene compounds (pre-catalysts) having a structure represented by formula (3) having $C_s$ or pseudo-$C_s$ symmetry:

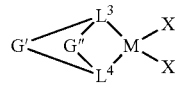

(3)

wherein:

M is zirconium;

L³ is a cyclopentadienyl ring optionally substituted in the 4 position of the ring, the substituent group being chosen from a radical group which is a hydrocarbyl, substituted hydrocarbyl, halocarbyl, substituted halocarbyl, silylcarbyl or germylcarbyl;

L⁴ is a substituted cyclopentadienyl ring with symmetric or pseudo symmetric substituents in the 3 and 5 positions of the ring, each substituent group being, independently, a radical group which is a hydrocarbyl, substituted hydrocarbyl, halocarbyl, substituted halocarbyl, silylcarbyl or germylcarbyl;

G' and G" are bridging groups;

X are independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a anionic chelating ligand.

In formula (3), L³ is cyclopentadienyl, or hydrocarbyl or silylcarbyl substituted cyclopentadienyl with the substitution on the 4-position of the cyclopentadienyl ring, or preferably cyclopentadienyl, 4-methylcyclopentadienyl, 4-ethylcyclopentadienyl, 4-propylcyclopentadienyl, 4-butylcyclopentadienyl, 4-pentylcyclopentadienyl, 4-hexylcyclopentadienyl, 4-heptylcyclopentadienyl, 3-octylcyclopentadienyl, or 4-trimethylsilylcyclopentadieyl, or preferably cyclopentadienyl, 4-isopropylcyclopentadienyl, 4-tert-butylcyclopentadienyl, 4-(2,2-dimethylpent-3-yl)cyclopentadienyl, 4-(2,2-dimethylbut-3-yl)cyclopentadienyl or 4-trimethylsilylcyclopentadienyl, or preferably cyclopentadienyl, 4-isopropylcyclopentadienyl, or 4-trimethylsilylcyclopentadienyl; L⁴ is hydrocarbyl or silylcarbyl substituted cyclopentadienyl with the substitutions on the 3- and 5-positions of the cyclopentadienyl ring, or preferably 3,5-dimethylcyclopentadienyl, 3,5-diethylcyclopentadienyl, 3,5-dipropylcyclopentadienyl, 3,5-dibutylcyclopentadienyl, 3,5-dipentylcyclopentadienyl, 3,5-dihexylcyclopentadienyl, 3,5-dibenzylcyclopentadienyl, or 3,5-bis(trimethylsilyl)cyclopentadieyl, or preferably 3,5-dimethylcyclopentadienyl, 3,5-diisopropylcyclopentadienyl, 3,5-di-tert-butylcyclopentadienyl, 3,5-dicyclopentylcyclopentadienyl, 3,5-dipent-3-ylcyclopentadienyl, 3,5-dicyclohexylcyclopentadienyl, 3,5-dibenzylcyclopentadienyl, or 3,5-bis(trimethylsilyl)cyclopentadienyl, or preferably 3,5-dimethylcyclopentadienyl, 3,5-diisopropylcyclopentadienyl, 3,5-di-tertbutylcyclopentadienyl, 3,5-dibenzylcyclopentadienyl, or 3,5-bis(trimethylsilyl)cyclopentadieyl; each G' and G" are methylene, dimethylmethylene, dimethylsilylene, or preferably dimethylmethylene, and dimethylsilylene; or preferably dimethylsilylene; X is hydrocarbyl or halo, or preferably methyl, benzyl, floro or chloro, or preferably methyl or chloro; M is zirconium.

A subset of the metallocene compounds (pre-catalysts) represented by formula (3) that may be used include those having $C_s$ or pseudo-$C_s$ symmetry are represented by formula (3a):

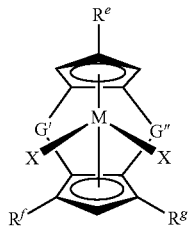

(3a)

wherein M, G', G", and X are defined as in formula (3);

$R^e$ is selected from hydrogen or a hydrocarbyl, substituted hydrocarbyl, halocarbyl, substituted halocarbyl, silylcarbyl or germylcarbyl radicals;

each $R^f$ and $R^g$ are selected from hydrocarbyl, substituted hydrocarbyl, halocarbyl, substituted halocarbyl, silylcarbyl, or germylcarbyl, with the proviso that each $R^f$ and $R^g$ are chosen to allow the compound to be $C_s$-symmetric or pseudo $C_s$-symmetric.

In some embodiments of formula (3a), each $R^f$ and $R^g$ are preferably hydrocarbyl or silylcarbyl, more preferably, methyl, ethyl, propyl, butyl, pentyl, hexyl, benzyl, or trimethylsilyl, more preferably, methyl, isopropyl, tert-butyl, cyclopentyl, pent-3-yl, cyclohexyl, benzyl, or trimethylsilyl, and most preferably methyl, isopropyl, tert-butyl, benzyl or trimethylsilyl; and $R^e$ is preferably hydrogen, hydrocarbyl or silylcarbyl, more preferably, methyl, ethyl, propyl, butyl, pentyl, hexyl, heptyl, octyl, or trimethylsilyl; even more preferably, hydrogen, isopropyl, tert-butyl, 2,2-dimethylpent-3-yl, 2,2-dimethylbut-3-yl, or trimethylsilyl, and most preferably, hydrogen, isopropyl or trimethylsilyl.

In formulas 1, 1a, 1b, 2, 3 or 3a, G, G' and G" are selected from $R*_2C$, $R*_2Si$, $R*_2Ge$, $R*_2CCR*_2$, $R*C=CR*$, $R*_2CSiR*_2$, $R*_2SiSiR*_2$, $R*B$, $R*_2C$—$BR*$, $R*N$, $R*P$, O, S, and Se, where each R* is independently selected from hydrogen, $C_1$-$C_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated, cyclic or polycyclic substituent. Preferably, G, G' and G" are selected from $R*_2C$, $R*_2Si$, $R*_2Ge$, $R*_2CCR*_2$, $R*B$, $R*N$, $R*P$, O, S, and Se, where each R* is as defined above. Most preferably, G, G' and G" are selected from $R*_2C$, $R*_2Si$, and $R*_2CCR*_2$.

Catalysts capable of making the syndiotactic propylene-α-olefin copolymers described herein may also include metallocene compounds (pre-catalysts) having a structure represented by formula (4) having $C_2$ symmetry:

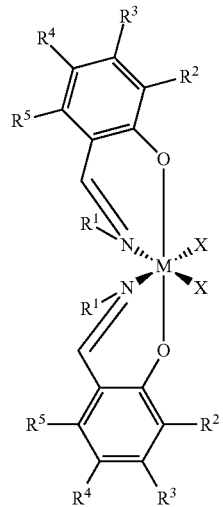

(4)

wherein:
M is zirconium or titanium;
O is oxygen;
N is nitrogen;

$R^1$ is a radical group which is a hydrocarbyl, substituted hydrocarbyl, halocarbyl, substituted halocarbyl, silylcarbyl or germylcarbyl, most preferably $R^1$ is halocarbyl;

$R^2$ is a radical group which is a hydrocarbyl, substituted hydrocarbyl, halocarbyl, substituted halocarbyl, silylcarbyl or germylcarbyl, most preferably $R^2$ is hydrocarbyl having three or more carbon atoms or silylcarbyl having three or more carbon atoms;

$R^3$, $R^4$ and $R^5$ are independently hydrogen or a radical group which is a hydrocarbyl, substituted hydrocarbyl, halocarbyl, substituted halocarbyl, silylcarbyl or germylcarbyl, most preferably $R^3$, $R^4$ and $R^5$ are hydrogen;

X are independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a anionic chelating ligand.

In some embodiments of formula (4), $R^1$ is preferably hydrocarbyl or halocarbyl radicals, more preferably, methyl, ethyl, propyl, butyl, pentyl, hexyl, benzyl, phenyl, methylphenyl, dimethylphenyl, ethylphenyl, diethylphenyl, propylphenyl, dipropylphenyl, perfluorophenyl, trifluorphenyl, difluorophenyl, or fluorophenyl, more preferably, phenyl, 2-methylphenyl, 2,6-dimethylphenyl, 2-isopropylphenyl, perfluorophenyl, 2,4,6-trifluorophenyl, 2,6-difluorophenyl, 3,5-difluorophenyl or 4-fluorophenyl, and most preferably perfluorophenyl; $R^2$ is preferably hydrocarbyl or silylcarbyl radicals, more preferably $C_3$-$C_{12}$ hydrocarbyl or $C_3$-$C_{12}$ silylcarbyl, even more preferably, propyl, butyl, pentyl, hexyl, heptyl, octyl, cumyl, or trimethylsilyl, still even more preferably, isopropyl, tert-butyl, cumyl, or trimethylsilyl, and most preferably, tert-butyl or trimethylsilyl; $R^3$, $R^4$ and $R^5$ are preferably hydrogen or hydrocarbyl radicals, most preferably hydrogen; X is preferably hydrocarbyl or halo, more preferably methyl, benzyl, floro or chloro, most preferably methyl or chloro; M is titanium.

Preferred metallocene compounds (pre-catalysts) which, according to the present disclosure, provide catalyst systems which are specific to the production of poly-olefins typically having greater than 6% mr triads.

Activators and Catalyst Activation

The terms "cocatalyst" and "activator" are used herein interchangeably and are defined to be any compound which can activate any one of the pre-catalyst compounds described above by converting the neutral pre-catalyst compound to a catalytically active cationic compound. Non-limiting activators, for example, include alumoxanes, aluminum alkyls, ionizing activators, which may be neutral (Lewis acid activators) or ionic (ionic activators), and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

Lewis acid activators include triphenylboron, tris-perfluorophenylboron, tris-perfluorophenylaluminum, but exclude the class of activators referred to as alumoxanes. Ionic activators include dimethylanilinium tetrakisperfluorophenylborate, triphenylcarbonium tetrakisperfluorophenylborate, dimethylanilinium tetrakisperfluorophenylaluminate. Collectively, Lewis acid activators and ionic activators are referred to as discrete activators since they can be readily characterized, whereas alumoxanes are not well characterized. Likewise, Lewis acid activators and ionic activators are referred to as stoichiometric activators since relatively low molar ratios of activator to transition metal compound are needed as compared to alumoxanes activators that require large excesses.

Neutral or ionic activators such as tri(n-butyl)ammonium tetrakis(pentafluoropheny0borate, trisperfluorophenylboron, trisperfluoronaphthylboron, polyhalogenated heteroborane anions, boric acid, or combinations thereof may also be used.

Stoichiometric activators (at times used in combination with a co-activator) may be used in producing the syndiotactic propylene-α-olefin copolymers described herein. Preferably, discrete ionic activators such as [Me$_2$PhNH][B(C$_6$F$_5$)$_4$], [Ph$_3$C][B(C$_6$F$_5$)$_4$], [Me$_2$PhNH][B(C$_6$H$_3$-3,5-(CF$_3$)$_2$)$_4$], [Ph$_3$C][B(C$_6$H$_3$-3,5-(CF$_3$)$_2$)$_4$], [NH$_4$][B(C$_6$H$_5$)$_4$] or Lewis acidic activators such as B(C$_6$F$_5$)$_3$ or B(C$_6$H$_5$)$_3$ are used, where Ph is phenyl and Me is methyl.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be prepared by reacting a transition metal compound with an activator, such as B(C$_6$F$_6$)$_3$, which upon reaction with the hydrolyzable ligand (X') of the transition metal compound forms an anion, such as ([B(C$_6$F$_5$)$_3$(X')]$^-$), which stabilizes the cationic transition metal species generated by the reaction. The catalysts can be, and preferably are, prepared with activator components which are ionic compounds or compositions. However preparation of activators utilizing neutral compounds is also contemplated.

Compounds useful as an activator component in the preparation of the ionic catalyst systems used in the process may comprise a cation, which is preferably a Brønsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the ionic stoichiometric activators include a cation and an anion component, and may be represented by the following formula:

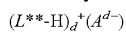

wherein L is an neutral Lewis base; H is hydrogen; (L-H)+ is a Brønsted acid, and A$^{d-}$ is a non-coordinating anion having the charge d–, and d is an integer from 1 to 3.

The cation component, (L**-H)$_d^+$ may include Brønsted acids such as protons or protonated Lewis bases or reducible Lewis acids capable of protonating or abstracting a moiety, such as an alkyl or aryl, from the precatalyst after alkylation.

The activating cation (L-H)$_d^+$ may be a Brønsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether, diethyl ether, tetrahydrofuran and dioxane, sulfoniums from thioethers, such as diethyl thioethers and tetrahydrothiophene, and mixtures thereof. The activating cation (L-H)$_d^+$ may also be a moiety such as silver, tropylium, carbeniums, ferroceniums and mixtures, preferably carboniums and ferroceniums; most preferably triphenyl carbonium. The anion component A$^{d-}$ include those having the formula [M$^{k+}$Q$_n$]$^{d-}$ wherein k is an integer from 1 to 3; n is an integer from 2-6; n–k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ also include diboron compounds as disclosed in U.S. Pat. No. 5,447,895, which is fully incorporated herein by reference.

Illustrative, but not limiting examples of boron compounds which may be used as a non-coordinating anion activator in combination with a co-activator in the preparation of the catalysts of this disclosure are tri-substituted ammonium salts such as: trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis (perfluoronaphthyl)borate, tri(n-butyl)ammonium tetrakis (perfluoronaphthyl)borate, tri(tert-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis (perfluorobiphenyl)borate, trimethylammonium tetrakis(3, 5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri (n-butyl)ammonium tetrakis(3,5-bis(trifluoromethyl)phenyl)borate, tri(tert-butyl)ammonium tetrakis(3,5-bis (trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis (trifluoromethyl)phenyl)borate, and dialkyl ammonium salts such as: di-(isopropyl) ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl) borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluoropheny0borate, triphenylphosphonium tetrakis(pentafluorophenyl)borate, triethylsilylium tetrakis(pentafluorophenyl)borate, benzene (diazonium) tetrakis(pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl) borate, benzene(diazonium) tetrakis-(2,3,4,6-tetrafluorophenyl)borate, tropillium tetrakis (perfluoronaphthyl)borate, triphenylcarbenium tetrakis (perfluoronaphthyl)borate, triphenylphosphonium tetrakis (perfluoronaphthyl)borate, triethylsilylium tetrakis (perfluoronaphthyl)borate, benzene(diazonium) tetrakis (perfluoronaphthyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium) tetrakis (perfluorobiphenyl)borate, tropillium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, and benzene(diazonium) tetrakis(3,5-bis(trifluoromethyl)phenyl)borate.

Most preferably, the non-coordinating anion activator, $(L^{**}\text{-H})_d^+ (A^{d-})$, is N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

The catalyst precursors can also be activated with cocatalysts or activators that comprise non-coordinating anions containing metalloid-free cyclopentadienide ions. These are described in U.S. Patent Publication 2002/0058765 A1, and for the instant disclosure, require the addition of a co-activator to the catalyst pre-cursor. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Preferred non-coordinating anions useful in accordance with this disclosure are those that are compatible, stabilize the transition metal complex cation in the sense of balancing its ionic charge at +1, and yet retain sufficient liability to permit displacement by an ethylenically or acetylenically unsaturated monomer during polymerization. These types of cocatalysts are sometimes used with scavengers such as but not limited to tri-iso-butylaluminum, tri-n-octylaluminum, tri-n-hexylaluminum, triethylaluminum or trimethylaluminum.

Disclosure processes also can employ cocatalyst compounds or activator compounds that are initially neutral Lewis acids but form a cationic metal complex and a non-coordinating anion, or a zwitterionic complex upon reaction with the alkylated transition metal compounds. The alkylated metallocene compound is formed from the reaction of the catalyst pre-cursor and the co-activator. For example, tris(pentafluorophenyl) boron or aluminum act to abstract a hydrocarbyl ligand to yield an disclosure cationic transition metal complex and stabilizing non-coordinating anion, see EP-A-0 427 697 and EP-A-0 520 732 for illustrations of analogous group-4 metallocene compounds. Also, see the methods and compounds of EP-A-0 495 375. For formation of zwitterionic complexes using analogous group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, 1391-1434 (2000).

When the cations of non-coordinating anion activators are Brønsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric activator (such as an NCA) is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:500 to 1:1, 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

In some embodiments preferred activators and activator/co-activator combinations include dimethylanilinium tetrakis(pentafluorophenyl)borate or tris(pentafluorophenyl)boron, or mixtures of trialkyl aluminum with dimethylanilinium tetrakis(pentafluorophenyl)borate or tris(pentafluorophenyl)boron. In some embodiments, scavenging compounds are used with stoichiometric activators. Typical aluminum or boron alkyl components useful as scavengers are represented by the general formula $R^xJ'Z'_2$ where J' is aluminum or boron, $R^x$ is as previously defined above, and each Z' is independently $R^x$ or a different univalent anionic ligand such as halogen (Cl, Br, I), alkoxide ($OR^x$) and the like. Most preferred aluminum alkyls include triethylaluminum, diethylaluminum chloride, tri-iso-butylaluminum, tri-n-octylaluminum, tri-n-hexylaluminum, trimethylaluminum and the like. Preferred boron alkyls include triethylboron. Scavenging compounds may also be alumoxanes and modified alumoxanes including methylalumoxane and modified methylalumoxane.

Supported Catalysts

Supported catalysts or supported catalyst systems may be used to prepare the syndiotactic propylene-α-olefin copolymers. To prepare uniform supported catalysts, the catalyst precursor preferably dissolves in the chosen solvent. The term "uniform supported catalyst" means that the catalyst precursor, the activator, and or the activated catalyst approach uniform distribution upon the support's accessible surface area, including the interior pore surfaces of porous supports. Some embodiments of supported catalysts prefer uniform supported catalysts; other embodiments show no such preference.

Useful supported catalyst systems may be prepared by any method effective to support other coordination catalyst systems, effective meaning that the catalyst so prepared can be used for polymerizing olefins in a heterogeneous process. The catalyst precursor, activator, co-activator (if needed), suitable solvent, and support may be added in any order or simultaneously.

By one method, the activator (with or without co-activator), dissolved in an appropriate solvent such as toluene, may be stirred with the support material for 1 minute to 10 hours to prepare the supported catalyst. The total solution volume (of the catalyst solution, the activator solution or both) may be greater than the pore volume of the support, but some embodiments limit the total solution volume below that needed to form a gel or slurry (90% to 400%, preferably 100-200%, of the pore volume). The mixture is optionally heated from 30-200° C. during this time. The catalyst precursor may be added to this mixture as a solid, if a suitable solvent is employed in the previous step, or as a solution. Alternatively, the mixture can be filtered, and the resulting solid mixed with a catalyst precursor solution. Similarly, the mixture may be vacuum-dried and mixed with a catalyst precursor solution. The resulting catalyst mixture is then stirred for 1 minute to 10 hours, and the supported catalyst is either filtered from the solution and vacuum dried or subjected to evaporation to remove the solvent.

Alternatively, the catalyst precursor and activator (and optional co-activator) may be combined in solvent to form a solution. The support is then added to the solution, and the resulting mixture is stirred for 1 minute to 10 hours. The total activator/catalyst-precursor solution volume may be greater than the pore volume of the support, but some embodiments limit the total solution volume below that needed to form a gel or slurry (90% to 400%, preferably 100-200% of the pore volume). After stirring, the residual solvent is removed under vacuum, typically at ambient temperature and over 10-16 hours; however, greater or lesser times and temperatures may be used.

The catalyst precursor may also be supported absent the activator; in this case, the activator (and co-activator if needed) is added to the liquid phase of a slurry process. For example, a solution of catalyst precursor may be mixed with a support material for a period of 1 minute to 10 hours. The resulting precatalyst mixture may be filtered from the solution and dried under vacuum or treated with evaporation to remove the solvent. The total catalyst-precursor-solution volume may be greater than the support's pore volume, but some embodiments limit the total solution volume below that needed to form a gel or slurry (90% to 400%, preferably 100-200% of the pore volume).

Additionally, two or more different catalyst precursors may be placed on the same support using any of the support methods disclosed above. Likewise, two or more activators or an activator and a co-activator, may be placed on the same support.

Suitable solid particle supports are typically comprised of polymeric or refractory oxide materials, each being preferably porous. Any support material that has an average particle size greater than 10 µm is suitable for use in this disclosure. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as an activator component. But additional activator may also be used. In some cases, a special family of solid support commonly known as MCM-41 can also be used. MCM-41 is a new class of unique crystalline support and can be prepared with tunable pore size and tunable acidity when modified with a second component. A detailed description of this class of materials and their modification can be found in U.S. Pat. No. 5,264,203.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the disclosure, see for example the descriptions in WO 95/15815 and U.S. Pat. No. 5,427,991. The methods disclosed may be used with the catalyst compounds, activators or catalyst systems of this disclosure to adsorb or absorb them on the polymeric supports, particularly if made up of porous particles, or may be chemically bound through functional groups bound to or in the polymer chains.

Useful catalyst carriers typically have a surface area of from 10-700 m$^2$/g, and or a pore volume of 0.1-4.0 cc/g and or an average particle size of 10-500 µm. Some embodiments select a surface area of 50-500 m$^2$/g, and or a pore volume of 0.5-3.5 cc/g, and or an average particle size of 20-200 µm. Other embodiments select a surface area of 100-400 m$^2$/g, and or a pore volume of 0.8-3.0 cc/g, and or an average particle size of 30-100 µm. Useful carriers typically have a pore size of 10-1000 Ångströms, alternatively 50-500 Ångströms, or 75-350 Ångströms.

The precatalyst and or the precatalyst/activator combinations are generally deposited on the support at a loading level of 10-100 micromoles of catalyst precursor per gram of solid support; alternatively 20-80 micromoles of catalyst precursor per gram of solid support; or 40-60 micromoles of catalyst precursor per gram of support. But greater or lesser values may be used provided that the total amount of solid catalyst precursor does not exceed the support's pore volume.

The precatalyst and or the precatalyst/activator combinations can be supported for gas-phase, bulk, or slurry polymerization, or otherwise as needed. Numerous support methods are known for catalysts in the olefin polymerization art, particularly alumoxane-activated catalysts; all are suitable for use herein. See, for example, U.S. Pat. Nos. 5,057,475 and 5,227,440. An example of supported ionic catalysts appears in WO 94/03056. U.S. Pat. No. 5,643,847 and WO 96/04319A which describe a particularly effective method. Both polymers and inorganic oxides may serve as supports, see U.S. Pat. Nos. 5,422,325, 5,427,991, 5,498,582 and 5,466,649, and international publications WO 93/11172 and WO 94/07928.

In another preferred embodiment, the precatalyst and or activator (with or without a support) are combined with an alkylaluminum compound, preferably a trialkylaluminum compound, prior to entering the reactor. Preferably the alkylaluminum compound is represented by the formula: $R_3Al$, where each R is independently a $C_1$ to $C_{20}$ alkyl group; preferably the R groups are independently selected from the group consisting of methyl, ethyl, propyl, isopropyl, butyl, isobutyl, n-butyl, pentyl, isopentyl, n-pentyl, hexyl, isohexyl, n-hexyl, heptyl, octyl, isooctyl, n-octyl, nonyl, isononyl, n-nonyl, decyl, isodecyl, n-decyl, undecyl, isoundecyl, n-undecyl, dodecyl, isododecyl, and n-dodecyl, preferably isobutyl, n-octyl, n-hexyl, and n-dodecyl. Preferably the alkylaluminum compound is selected from triisobutyl aluminum, tri n-octyl aluminum, tri-n-hexyl aluminum, and tri-n-dodecyl aluminum.

Chain Transfer Agent

The process as described herein may comprise polymerization in the presence of a chain transfer agent or chain shuttling agent. It is believed the use of chain transfer agent can help formation of syndiotactic stereo arrangement of the propylene within the propylene-α-olefin copolymer and can result into a lower molecular weight distribution.

Preferable chain transfer agents include alkylaluminum compounds represented by the formula: $R_3Al$, where each R is, independently, a $C_1$ to $C_{18}$ alkyl group, preferably each R is, independently, selected from the group consisting of methyl, ethyl, n-propyl, isopropyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

In the process, hydrogen can also be used as a useful chain transfer agent in the reaction. In a preferred embodiment, alternative chain transfer agents can be used in the processes described herein, reducing the need for hydrogen wherein hydrogen is absent or used in limited amounts. Preferred alternative chain transfer agents include diethylzinc, and trialkylaluminums such as triisobutylaluminum, tri-n-octylaluminum, triethylaluminum and the like, or mixtures thereof.

In some embodiment, the chain transfer agent can be used at a molar ratio of the chain transfer agent to the transition metal compound of from 1:1 to 150:1. In one embodiment, the molar ratio of chain transfer agent to the transition metal compound can be greater than 5:1, or greater than 10:1, or greater than 20. Likewise, the molar ratio of chain transfer agent to the transition metal compound can be less than 120:1, or less than 100:1, or less than 80:1.

Monomers

The catalyst compounds described herein are used to polymerize propylene and any unsaturated comonomers. Such comonomers include $C_4$ to $C_{20}$ α-olefins, $C_6$ to $C_{20}$ α-olefins, $C_6$ to $C_{10}$ α-olefins, or $C_4$ to $C_{10}$ α-olefins. In some embodiments, useful monomers include linear, branched or cyclic α-olefins, such as $C_6$ to $C_{20}$ linear α-olefins, $C_6$ to $C_{14}$ linear α-olefins, or $C_8$ to $C_{12}$ linear α-olefins. Particular olefin monomers may be one or more of 1-hexene, 1-heptene, 1-octene, 1-nonene, 1-decene, 1-undecene, 1-dodecene, 1-tridecene, 1-tetradecene, 3-methyl-1-butene, 1-tetradecene and mixtures thereof. In another embodiment, the alpha olefin is selected from the group consisting of 1-hexene, 1-octene, 1-decene, 1-dodecene, and 1-tetradecene, either singly or mixtures thereof. In preferred embodiments, the α-olefin is 1-hexene.

In some embodiments, the syndiotactic propylene-α-olefin polymer can comprise two or more comonomers, or may comprise three or more comonomers, or may comprise four or more comonomers, or may comprise five or more comonomers. For example, a $C_6$ and $C_8$ mixture, a $C_6$ and $C_{10}$ mixture, a $C_8$ and $C_{10}$ mixture can be used as a feed.

Properties of Syndiotactic Propylene-α-Olefin Polymers

The syndiotactic propylene-α-olefin polymer comprises at least about 50 mole %, or at least 55 mole %, or at least 60 mole %, or at least 70 mol %, or at least 80 mole %, or at least 90 mole %, propylene-derived units. For example, the syndiotactic propylene-α-olefin copolymers may comprise from 60 mole % to 95 mole % propylene-derived units. Likewise, the syndiotactic propylene-α-olefin polymer can comprise equal to or less than about 95 mole % propylene, or equal to or less than about 88 mole % propylene, or equal to or greater than about 85 mole % propylene.

The syndiotactic propylene-α-olefin polymer can comprise equal to or less than 50 mole % $C_4$ to $C_{20}$ α-olefins based on the total weight of the olefins in the syndiotactic propylene-α-olefin polymer. In one embodiment the syndiotactic propylene-α-olefin polymer can comprise less than or equal to 45 mole % $C_4$ to $C_{20}$ α-olefin derived monomers, or less than or equal to 40 mole %, or less than or equal to 30 mole %. In some embodiments, the syndiotactic propylene-α-olefin polymer can comprise greater than or equal to 5 mole % $C_4$ to $C_{20}$ α-olefin derived monomers, or greater than or equal to 12 mole %, or greater than or equal to 15 mole %.

The syndiotactic propylene-α-olefin polymer has a melt flow rate as determined by ASTM D-1238 (230° C., 2.16 kg), of from about 0.1 to about 20 g/10 min, or from about 0.2 to about 18 g/10 min, or from about 0.5 to about 15 g/10 min, or from about 0.8 to about 12 g/10 min, or from about 1 to about 10 g/10 min, or from about 2 to 10 g/10 min, or from about 2.5 to 8 g/10 min, where desirable ranges may include the combination of any lower limit and any upper limit.

The stereoregularity of the syndiotactic propylene-α-olefin polymer can be determined by the catalyst, total monomer concentrations, and reactor temperature. It is believed that the syndiotactic propylene-α-olefin polymer made according to the process of described herein may comprise up to 99.9% r-dyads based on the total number of dyads present in the polymer.

The number average molecular weight (Mn) of the syndiotactic propylene-α-olefin polymer can be about 10,000 to about 1,000,000 g/mole. The weight average molecular weight (Mw) of the syndiotactic propylene-α-olefin polymer can be about 20,000 to about 2,000,000 g/mol. The molecular weight distribution MWD (Mw/Mn) of the syndiotactic propylene-α-olefin polymers can be less than about 5, for example, from about 1.0 to about 2.5.

Lubricating Oil

Described herein are lubricating oil compositions comprising the syndiotactic propylene-α-olefin polymer as described herein, together with one or more base oils or base stocks. The base oil or base stock may include Group I to Group V base stocks with viscosity range from 1.5 to 100 cSt at 100° C.

The lubricating oil may comprise at least 50 wt % of a base oil based on the weight of the lubricating oil composition. For example, the base oil may be present in the lubricating oil composition in an amount of at least 60 wt %, or at least 70 wt %, or at least 80 wt %, or at least 90 wt % or even at least 95 wt %, or at least 96 wt %, or at least 97 wt %, or at least 98 wt %, based on the weight of the lubricating oil composition.

The amount of the syndiotactic propylene-α-olefin polymer present in the lubricating oil composition may be from 0.1 wt % to 10 wt %, or from 0.2 wt % to 8 wt %, or from 0.3 wt % to 7 wt %, or from 0.4 wt % to 6 wt %, or from 0.5 wt % to 5 wt %, based on the weight of the lubricating oil, where desirable ranges may include ranges from any lower limit to any upper limit.

The syndiotactic propylene-α-olefin polymer produced herein can be optionally combined with one or more other additives, which include, but are not limited to, dispersants, detergents, friction modifiers, traction improving additives, demulsifiers, defoamants, chromophores (dyes), and/or haze inhibitors. Examples of automotive engine lubricant formulations and additives can be found in U.S. Pat. No. 6,713,438. The fully formulated lubricants can be used in automotive crank case oil (engine oil), industrial oil, grease, or gas turbine engine oil. These are examples of additives used in finished lubricant formulations.

In one embodiment, the syndiotactic propylene-α-olefin polymer can be used alone or together with other traditional VI improver (e.g., OCP (olefin-copolymer) or polymethacrylates).

Usually, the viscosity grade of the final product can be adjusted by suitable blending of base stock components of differing viscosities. In the lubricating oil compostions herein, the viscosity grade of the final product can also be adjusted by addition in a suitable amount of the syndiotactic propylene-α-olefin polymers. As such, the lubricating oil compositions containing the syndiotactic propylene-α-olefin polymers can have exceptionally good viscometrics, high thickening efficiency, good high temperature high shear performance and acceptable shear stability index.

Without being bound by theory, it is believed that the performance of VI improvers can be substantially improved, as measured by the viscometrics and the thickening efficiency (TE) by appropriate and careful manipulation of the syndiotactic stereo arrangement of propylene of the VI improver. TE can be defined as efficiency of the amount of a given polymer required to increase base oil kinematic viscosity by a factor of 2 at 100° C., and can be measured by the following equation:

$$TE=2(\log B - \log R)/M^*\log 2$$

where R is the viscosity of the base oil, B is the viscosity of the polymer solution prepared, and M is the mass of polymer in solution (gms of polymer/100 gms of base oil).

The lubricating oil comprising the syndiotactic propylene-α-olefin polymer may have a thickening efficiency of greater than about 1.5, or greater than or equal to about 2.2, or greater than or equal to about 2.4, or greater than about 3. Likewise, the thickening efficiency can be less than or equal to 4, or less than or equal to about 2, or less than or equal to about 1.8, or less than or equal to about 1.6.

The lubricating oil comprising the syndiotactic propylene-α-olefin polymers can have a viscosity index, as calculated by the ASTM D2270 method for calculating viscosity index from the kinematic viscosity at 40° C. and 100° C., of greater than about 120, or greater than about 140, or greater than about 150, or greater than about 155, or greater than about 160. Likewise, the lubricating oil may have a viscosity index of less than about 240, or less than about 220, or less than about 210, or less than about 200.

The lubricating oil comprising the syndiotactic propylene-α-olefin polymers can have a kinematic viscosity at 40° C., as measured ASTM D445-3, of greater than about 50 cSt, or greater than about 55 cSt, or greater than about 60 cSt, or greater than about 70 cSt, or greater than about 75 cSt, or greater than about 80 cSt, or greater than about 90 cSt. Likewise, the lubricating oil comprising the syndiotactic propylene-α-olefin polymers can have a kinematic viscosity at 40° C. of less than about 500 cSt, or less than about 450 cSt, or less than about 400 cSt, or less than about 250 cSt, or less than about 200 cSt, or less than about 150 cSt, or less than about 100 cSt.

The lubricating oil comprising the syndiotactic propylene-α-olefin polymers can have a kinematic viscosity at 100° C., as measured by ASTM D445-5, of greater than about 10 cSt, or greater than about 10 cSt, or greater than about 11 cSt, or greater than about 12 cSt, or greater than about 13 cSt, or greater than about 15 cSt. Likewise, the lubricating oil comprising the syndiotactic propylene-α-olefin polymers can have a kinematic viscosity at 100° C. less than about 200 cSt, or less than about 150 cSt, or less than about 100 cSt, or less than about 50 cSt, or less than about 40 cSt, or less than about 30 cSt, less than about 20 cSt.

The lubricating oil comprising the syndiotactic propylene-α-olefin polymers can have shear stability index (SSI) of less than about 70 as determined at 30 cycles (ASTM D6278) and/or 90 cycles (ASTM D7109) using a Kurt Orbahn (KO) diesel injection apparatus. SSI can represent the fraction of viscosity contributed by the viscosity modifier (OCP or EPR) that is lost during shear, and can be measured by the following equation:

$$SSI=100\times(V_0-V_s)/(V_0-V_b)$$

where $V_0$=viscosity of un-sheared oil, Vs=viscosity of sheared oil, and $V_b$=viscosity of the base fluid (without polymer). The above equation can be valid only if the degree of thickening ("DT"=$V_0/V_b$) is greater than or equal to 1.2. If the degree of thickening is less than 1.2, SSI cannot be determined from the data as $V_b$ is too close in value to $V_0$ making the denominator in SSI equation approaches 0.

The SSI of the lubricating oil composition as determined at 30 cycles and/or 90 cycles can be less than about 70, or less than about 65, or less than about 60, or less than about 55, or less than about 50, or less than about 45, or less than about 40.

EXAMPLES

The following examples are for purposes of illustration only and are non-limiting examples.

Preparation of Syndiotactic Propylene-Hexene Polymers

Syndiotactic propylene-hexene polymers were made using the polymerization conditions listed in Table 1. The polymerization reaction was carried out under nitrogen ($N_2$) inert atmosphere. All solutions were prepared using purified toluene as solvent. Propylene and 1-hexene were separately feed into reactor. The catalysts used in Examples 1 to 3 and Comparative Example 1 were di(para-triethylsilylphenyl)methylene(2,7-di-tertbutyl fluorenyl)(cyclopentadienyl)zirconium dimethyl ("Zr-CAT") and di(para-triethylsilylphenyl)(methylene(2,7-di-tertbutyl fluorenyl)(cyclopentadienyl)hafnium dimethyl ("Hf-CAT"), respectively. N,N-dimethylanilinium tetrakis(pentafluorophenyl) borate was used as activator. Tri-n-octyl-aluminum (TNOA) and hydrogen were also fed. The MFR of the resulting polymers were tested and results are shown in Table 1.

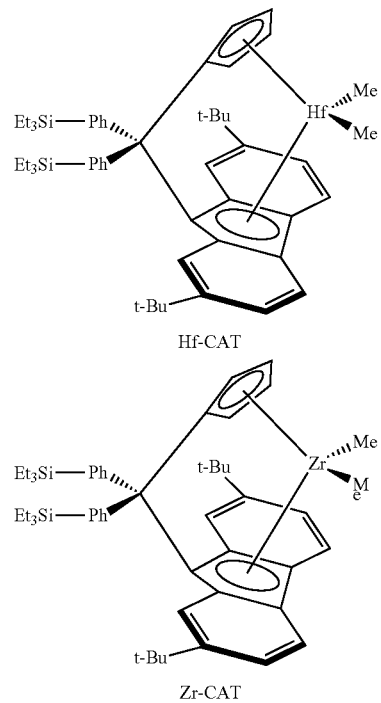

Hf-CAT

Zr-CAT

TABLE 1

Preparation of Syndiotactic Propylene-Hexene Copolymers

| | Example 1 | Example 2 | Example 3 | Comparative Example 1 |
|---|---|---|---|---|
| Reactor volume (liter) | 0.5 | 0.5 | 0.5 | 1 |

TABLE 1-continued

Preparation of Syndiotactic Propylene-Hexene Copolymers

|  | Example 1 | Example 2 | Example 3 | Comparative Example 1 |
|---|---|---|---|---|
| Reaction Temperature (° C.) | 50 | 50 | 50 | 50 |
| Reaction Pressure (psig) | 320 | 320 | 320 | 320 |
| Agitator (rpm) | 1500 | 1500 | 1500 | 1500 |
| Isohexane feed (g/min) | 32.5 | 32.5 | 35.3 | 65 |
| Propylene feed (g/min) | 5.0 | 5.0 | 5.0 | 10.0 |
| 1-hexene feed (g/min) | 1.54 | 1.54 | 1.54 | 13.46 |
| Catalyst | Zr-CAT | Zr-CAT | Zr-CAT | Hf-CAT |
| Catalyst feed (mol/min *$10^{-7}$) | 1.102 | 1.102 | 1.47 | 4.497 |
| Activator feed (mol/min *$10^{-7}$) | 1.125 | 1.125 | 1.5 | 4.589 |
| TNOA feed (mol/min *$10^{-6}$) | 5.16 | 5.16 | 10.3 | 10.3 |
| Net $H_2$ feed (sccm) | 2.41 | 2.41 | 0.242 | 2.39 |
| $H_2$ feed conc (tank) | 24.1 | 24.1 | 2.0 | 23.9 |
| Polyrate (reactor, g/min) | 0.29 | 0.18 | 1.80 | 9.40 |
| Cement % (calculated) | 1.1 | 0.9 | 5.3 | 14.6 |
| Activity (Rxr) (g/g) | 3019 | 1853 | 14318 | 22877 |
| Yield (g) | 17.1 | 10.5 | 72.1 | 97.1 |
| MFR (230° C., 2.16 kg) | 2.8 | 3.2 | 8.1 | 2.56 |

Preparation of Lubricating Oil

Lubricating oils were prepared using Jurong150, a Group II base oil, available from Exxon Mobil Corporation, and different polymers as VI improvers. In Comparative Examples C2 to C8, SV140 and SV150 are styrene-diene block copolymers and SV260 and SV300 are styrene-diene star shaped copolymers, all commercially available from Infineum Chemical Company, Viscoplex® 12-320 and 8-219 available from Evonik Oil Additives USA, Inc., and Lubrizol® 7773 available from The Lubrizol Corporation were used. In Comparative Example C9, the syndiotactic propylene-hexene polymer prepared in Comparative Example C1 above was used. In Comparative Examples C10 to C12, syndiotactic propylene-hexene polymers having unmeasurable fractional melt flow rates were used. In Examples 4 to 6, the syndiotactic propylene-hexene polymers respectively prepared in the above Examples 1 to 3 were used.

The lubricating oil compositions contained Irganox™ 1076 phenolic antioxidant available from BASF Corporation, Irgafos™ 168 phosphite antioxidant available from BASF Corporation, and 1.0 gram of the above VI improvers, dissolved in 98.98 grams of a Group II base oil to make up a total of 100 grams of polymer solution. The solution was then heated up to 140° C. for a short period of time (<1 hr.) to ensure all solids dissolved. The formulations for each Comparative Example and Example are shown in Table 2

Kinematic viscosities, thickening efficiency (TE), viscosity index (VI), and shear stability index (SSI) were tested with 1 wt % of the solution as samples, with the results shown in Table 2.

Thickening efficiency was calculated from Kinematic viscosity at 100° C. as measured by ASTM D445-5, as follows:

$$TE = 2(\log B - \log R)/M * \log 2$$

wherein R is the viscosity of the base oil, B is the viscosity of the polymer solution prepared, and M is the mass of polymer in solution (gms of polymer/100 gms of base oil).

Shear stability index was measured at 30 cycles (ASTM D6278) and 90 cycles (ASTM D7109) using a Kurt Orbahn (KO) diesel injection apparatus.

As seen from the results in Table 2, the lubricating oils of Examples 4 to 6 that comprised the syndiotactic propylene-hexene polymers made in the Examples 1 to 3 showed a better balance of high thickening efficiency with acceptable shear stability index, as compared with Comparative Examples C2 to C12, which comprised non-syndiotactic propylene-α-olefin polymers or syndiotactic propylene-α-olefin polymers having unmeasurable melt flow rate. Therefore, the syndiotactic propylene-α-olefin polymers described herein can be used as a high performance viscosity index improver.

TABLE 2

Lubricating Oil Compositions

| Example No. | C2 | C3 | C4 | C5 | C6 | C7 | C8 | 4 | 5 | 6 | C9 | C10 | C11 | C12 |
|---|---|---|---|---|---|---|---|---|---|---|---|---|---|---|
| Jurong 150 | 98.98 | 98.98 | 98.98 | 98.98 | 98.98 | 98.98 | 98.98 | 98.98 | 98.98 | 98.98 | 98.98 | 98.98 | 98.98 | 98.98 |
| Irganox 1076 | 0.015 | 0.015 | 0.015 | 0.015 | 0.015 | 0.015 | 0.015 | 0.015 | 0.015 | 0.015 | 0.015 | 0.015 | 0.015 | 0.015 |
| Irgafos 168 (Irganox L180) | 0.005 | 0.005 | 0.005 | 0.005 | 0.005 | 0.005 | 0.005 | 0.005 | 0.005 | 0.005 | 0.005 | 0.005 | 0.005 | 0.005 |
| SV 140 | 1 | | | | | | | | | | | | | |
| SV 150 | | 1 | | | | | | | | | | | | |
| SV 260 | | | 1 | | | | | | | | | | | |
| SV 300 | | | | 1 | | | | | | | | | | |
| Viscoplex 12-320 | | | | | 1 | | | | | | | | | |
| Viscoplex 8-219 | | | | | | 1 | | | | | | | | |
| Lubrizol 7773 | | | | | | | 1 | | | | | | | |
| sPP MFR = 8.1 | | | | | | | | 1 | | | | | | |
| sPP MFR = 3.2 | | | | | | | | | 1 | | | | | |
| sPP MFR = 2.8 | | | | | | | | | | 1 | | | | |
| sPP MFR = 2.56 | | | | | | | | | | | 1 | | | |
| sPP MFR = fractional | | | | | | | | | | | | 1 | 1 | 1 |

TABLE 2-continued

Lubricating Oil Compositions

| | Example No. | | | | | | | | | | | | |
|---|---|---|---|---|---|---|---|---|---|---|---|---|---|
| | C2 | C3 | C4 | C5 | C6 | C7 | C8 | 4 | 5 | 6 | C9 | C10 | C11 | C12 |
| sPP MFR = fractional | | | | | | | | | | | | | 1 | |
| sPP MFR = fractional | | | | | | | | | | | | | | 1 |
| Properties | | | | | | | | | | | | | | |
| KV 40 (H445-3) (cSt) | 92.00 | 54.32 | 74.20 | 92.00 | 31.15 | 31.07 | 31.05 | 71.53 | 76.79 | 82.83 | 92.93 | 396.50 | 511.90 | TVTM |
| KV 100 (H445-5) (cSt) | 15.69 | 10.2 | 12.31 | 14.51 | 5.6 | 5.61 | 5.59 | 11.67 | 12.46 | 13.33 | 15.30 | 55.96 | 75.26 | 155.50 |
| VI | 182 | 179 | 164 | 164 | 119 | 120 | 119 | 158 | 161 | 163 | 174 | 210 | 229 | NA |
| Thickening Efficiency (TE) | 3.1 | 1.86 | 2.4 | 2.9 | 0.13 | 0.13 | 0.12 | 2.24 | 2.43 | 2.63 | 3.03 | 6.77 | 7.62 | 9.72 |
| Shear Stability Index (30 cycles) | 45 | 7.7 | 19.2 | 51.3 | −0.7 | −0.2 | −0.5 | 37.2 | 47.3 | 51.5 | 67.1 | 92.1 | 95 | 97.1 |
| Shear Stability Index (90 cycles) | 72 | 17.8 | 42.2 | 63.9 | −0.7 | −0.3 | −0.6 | 41.5 | 51.3 | 55.4 | 70.5 | 93 | 95.6 | 97.5 |

TVTM = too viscous to measure.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A lubricating oil composition comprising:
   (i) at least 50 wt % of a base oil based on the weight of the lubricating oil; and
   (ii) a syndiotactic polymer containing units derived from at least one α-olefin having 4 to 10 carbon atoms and ≥50 mol % of units derived from propylene, wherein the polymer has a melt flow rate, as determined by ASTM D-1238 (2.16 kg, 230° C.), of about 1 g/10 m to about 10 g/10 min, and wherein the lubricating oil composition comprises about 0.1 wt % to about 10 wt % of the polymer based on the weight of the lubricating oil composition;
   wherein the polymer is produced by a polymerization process comprising contacting propylene and at least one α-olefin having 4 to 10 carbon atoms with a catalyst system comprising a precatalyst compound and an activator in a reactor;
   wherein the precatalyst compound is selected from those having the structure of formula (1), (2), (3), or (4);
   wherein structure (1) has a Cs or pseudo-Cs symmetry and the following formula (1):

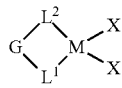

(1)

wherein
M is a zirconium;
L[1] is a unsubstituted fluorenyl, unsubstituted heterocyclopentapentalenyl, unsubstituted heterofluorenyl, substituted fluorenyl, substituted heterocyclopentapentalenyl, or substituted heterofluorenyl ligand with one or more symmetric or pseudo symmetric substituents, each substituent group being, independently, a radical group which is a hydrocarbyl, substituted hydrocarbyl, halocarbyl, substituted halocarbyl, silylcarbyl or germylcarbyl, and optionally two or more adjacent substituents may join to form a substituted or unsubstituted, saturated, partially unsaturated or aromatic, cyclic or polycyclic substituent;
L[2] is a cyclopentadienyl ring or a substituted cyclopentadienyl ring with one or more symmetric or pseudo symmetric substituents in the 2 and 5 positions of the ring, each substituent group being, independently, a radical group which is a hydrocarbyl, substituted hydrocarbyl, halocarbyl, substituted halocarbyl, silylcarbyl or germylcarbyl;
G is a bridging group; and
X are, independently, halogen, alkoxide, aryloxide, amide, phosphide, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from 3 to 20 carbon atoms; or both together can be an olefin, diolefin or aryne ligand; or both X can also be joined to form a anionic chelating ligand;

wherein structure (2) has Cs or pseudo-Cs symmetry and the following formula (2):

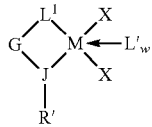
(2)

wherein:
M, L¹, G, and X are the same as in structure (1);
J is a heteroatom from group 15;
R' is a radical group which is a hydrocarbyl, substituted hydrocarbyl, halocarbyl, or substituted halocarbyl; and
L' is a neutral Lewis base and w represents the number of L' bonded to M where w is 0, 1, or 2, and optionally any L' and any X may be bonded to one another;
wherein structure (3) has Cs or pseudo-Cs symmetry and the following formula (3):

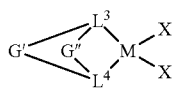
(3)

wherein:
M and X are the same as in structure (1);
L³ is a cyclopentadienyl ring optionally substituted in the 4 position of the ring, the substituent group being chosen from a radical group which is a hydrocarbyl, substituted hydrocarbyl, halocarbyl, substituted halocarbyl, silylcarbyl or germylcarbyl;
L⁴ is a substituted cyclopentadienyl ring with symmetric or pseudo symmetric substituents in the 3 and 5 positions of the ring, each substituent group being, independently, a radical group which is a hydrocarbyl, substituted hydrocarbyl, halocarbyl, substituted halocarbyl, silylcarbyl or germylcarbyl; and
G' and G" are bridging groups; and
wherein structure (4) has C2 symmetry and the following formula (4):

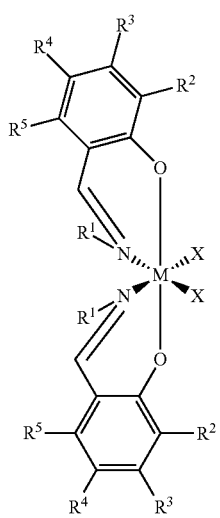
(4)

wherein:
X is the same as in structure (1);
M is titanium;
O is oxygen;
N is nitrogen;
R¹ is a radical group which is a hydrocarbyl, substituted hydrocarbyl, halocarbyl, substituted halocarbyl, silylcarbyl or germylcarbyl;
R² is a radical group which is a hydrocarbyl, substituted hydrocarbyl, halocarbyl, substituted halocarbyl, silylcarbyl or germylcarbyl; and
RL³, R⁴ and R⁵ are independently hydrogen or a radical group which is a hydrocarbyl, substituted hydrocarbyl, halocarbyl, substituted halocarbyl, silylcarbyl or germylcarbyl.

2. The lubricating oil composition of claim 1, wherein the at least one α-olefin comprises 1-hexene.

3. The lubricating oil composition of claim 1, wherein the lubricating oil composition comprises about 0.5 wt % to about 5 wt % of the polymer based on the weight of the lubricating oil composition.

4. The lubricating oil composition of claim 1, wherein the base oil is selected from Group II base oil, Group III base oil, Group IV base oil, Group V base oil, and combinations thereof.

5. The lubricating oil composition of claim 1, wherein the polymer has a thickening efficiency of greater than 1.5.

6. The lubricating oil composition of claim 1, wherein the lubricating oil composition has at least one of: a kinematic viscosity at 40° C., as measured by ASTM D445-3, of greater than 50 cSt, and a kinematic viscosity at 100° C., as measured by ASTM D445-5, of greater than 10 cSt.

7. The lubricating oil composition of claim 1, wherein the lubricating oil composition has a viscosity index, as calculated by ASTM D2270, of greater than 120.

8. The lubricating oil composition of claim 1, wherein the precatalyst compound has the structure of formula (1) and has Cs or pseudo-Cs symmetry of formula (1a) or (1b);
wherein structure (1a) has the following formula (1a):

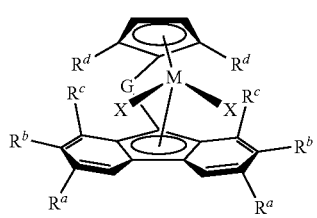
(1a)

wherein each $R^a$ and $R^b$ are selected from hydrogen, halogen, hydrocarbyl, substituted hydrocarbyl, halocarbyl, substituted halocarbyl, silylcarbyl, germylcarbyl or polar radicals, and optionally two or more adjacent substituents may join to form a substituted or unsubstituted, saturated, partially unsaturated or aromatic, cyclic or polycyclic substituent, with the proviso that each $R^a$ is the same and each $R^b$ is the same and allow the compound to be Cs-symmetric or pseudo Cs-symmetric;
each $R^c$ is a symmetric or pseudo symmetric substituent with respect to the other and is selected from hydrogen or a hydrocarbyl, substituted hydrocarbyl, halocarbyl, substituted halocarbyl, silylcarbyl or germylcarbyl radicals; and each $R^d$ is a symmetric or pseudo symmetric substituent with respect to the other and is selected from hydrogen or a hydrocarbyl, substituted hydrocarbyl, halocarbyl, substituted halocarbyl, silylcarbyl or germylcarbyl radicals; and wherein structure (1b) has the following formula (1b):

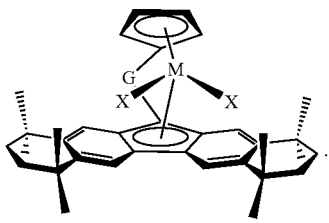

(1b)

9. The lubricating oil composition of claim 1, wherein the precatalyst compound has the structure of formula (3) and has Cs or pseudo-Cs symmetry of the following structure (3a):

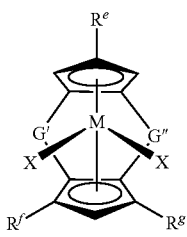

(3a)

wherein $R^e$ is selected from hydrogen, hydrocarbyl, substituted hydrocarbyl, halocarbyl, substituted halocarbyl, silylcarbyl, or germylcarbyl radicals;

each $R^f$ and $R^g$ are selected from hydrocarbyl, substituted hydrocarbyl, halocarbyl, substituted halocarbyl, silylcarbyl, or germylcarbyl, with the proviso that each $R^f$ and $R^g$ are chosen to allow the compound to be Cs-symmetric or pseudo Cs-symmetric.

10. The lubricating oil composition of claim 1, wherein the precatalyst compound comprises di(para-triethylsilylphenyl)methylene(2,7-di-tertbutyl fluorenyl)(cyclopentadienyl)zirconium dimethyl.

11. The lubricating oil composition of claim 1, wherein the activator comprises one or more of N,N-dimethylanilinium tetra(pentafluorophenyl)borate, N,N-dialkylphenylanilinium tetra(pentafluorophenyl)borate where the alkyl is a C1 to C18 alkyl group, trityl tetra(pentafluorophenyl)borate, tris(pentafluorophenyl)boron, tri-alkylammonium tetra(pentafluorophenyl)borate where the alkyl is a C1 to C18 alkyl group, tetra-alkylammonium tetra(pentafluorophenyl)borate where the alkyl is a C1 to C18 alkyl group.

12. The lubricating oil composition of claim 1, wherein the molecular weight distribution (Mw/Mn) of 1.0 to 2.5.

13. The lubricating oil composition of claim 1, wherein the polymer contains at least 60 mol % of units derived from propylene.

14. The lubricating oil composition of claim 1, wherein the lubricating oil composition has a kinematic viscosity at 40° C., as measured by ASTM D445-3, of less than 500 cSt.

15. The lubricating oil composition of claim 1, wherein the lubricating oil composition has a kinematic viscosity at 100° C., as measured by ASTM D445-5, of less than 50 cSt.

16. The lubricating oil composition of claim 1, wherein the lubricating oil composition has a kinematic viscosity at 100° C., as measured by ASTM D445-5, of greater than 10 cSt to less than 40 cSt.

* * * * *